United States Patent
Yamamoto et al.

[11] Patent Number: 6,115,099
[45] Date of Patent: Sep. 5, 2000

[54] LIQUID CRYSTAL DISPLAY DEVICE

[75] Inventors: Tomohiko Yamamoto, Nara; Keiichi Tanaka, Tenri; Naoto Inoue, Shiki-gun; Yutaka Ishii, Nara, all of Japan

[73] Assignee: Sharp Kabushiki Kaisha, Osaka, Japan

[21] Appl. No.: 09/330,506

[22] Filed: Jun. 11, 1999

[30] Foreign Application Priority Data

Jun. 12, 1998 [JP] Japan .................................. 10-165668
Apr. 28, 1999 [JP] Japan .................................. 11-122962

[51] Int. Cl.$^7$ ....................................................... G02F 1/13
[52] U.S. Cl. ............................................. 349/178; 349/177
[58] Field of Search ..................................... 349/178, 177, 349/171, 170

[56] References Cited

U.S. PATENT DOCUMENTS

| 4,236,155 | 11/1980 | Nagata ..................................... 349/178 |
| 4,694,287 | 9/1987 | Chenevas-Paule et al. . |
| 5,016,982 | 5/1991 | Fergason et al. ........................ 349/178 |

FOREIGN PATENT DOCUMENTS 62-133478 6/1987 Japan .
63-68818 3/1988 Japan .
10-333646 12/1998 Japan .

OTHER PUBLICATIONS

Oki, K., et al. "A New Active Matrix LCD Architecture for Larger Size Flat Display." *ITEJ Technical Report*, vol. 11, No. 27 (Nov. 1987), pp. 73–78. (In Japanese with translation of relevant passages.)

J. F. Clerc, et al. "New Electrodes Architectures for Liquid Crystal Displays Based on Thin Film Transistors." *Japan Display '86*, pp. 84–87. (1986).

*Primary Examiner*—James A. Dudek
*Attorney, Agent, or Firm*—Dike, Bronstein, Roberts & Cushman, LLP; David G. Conlin

[57] ABSTRACT

In order to provide a liquid crystal display device which uses a liquid crystal material having physical quantities set so as to contribute to high image quality by reducing crosstalk, flicker, and direct-current component shift, the liquid crystal material used in a liquid crystal display device according to the present invention has an effective dielectric constant $\epsilon_P$ in the direction of the long axis and an effective dielectric constant $\epsilon_V$ in the direction of the short axis which, if $X=\epsilon_P+\epsilon_V$ and $Y=\epsilon_P\cdot\epsilon_V$, satisfy $Y=A\cdot X-B$ at a certain point in the ranges $9.5 \leq X \leq 15.5$, $5.43 \leq A \leq 5.75$, and $27 \leq B \leq 36.2$.

12 Claims, 14 Drawing Sheets

F I G. 7
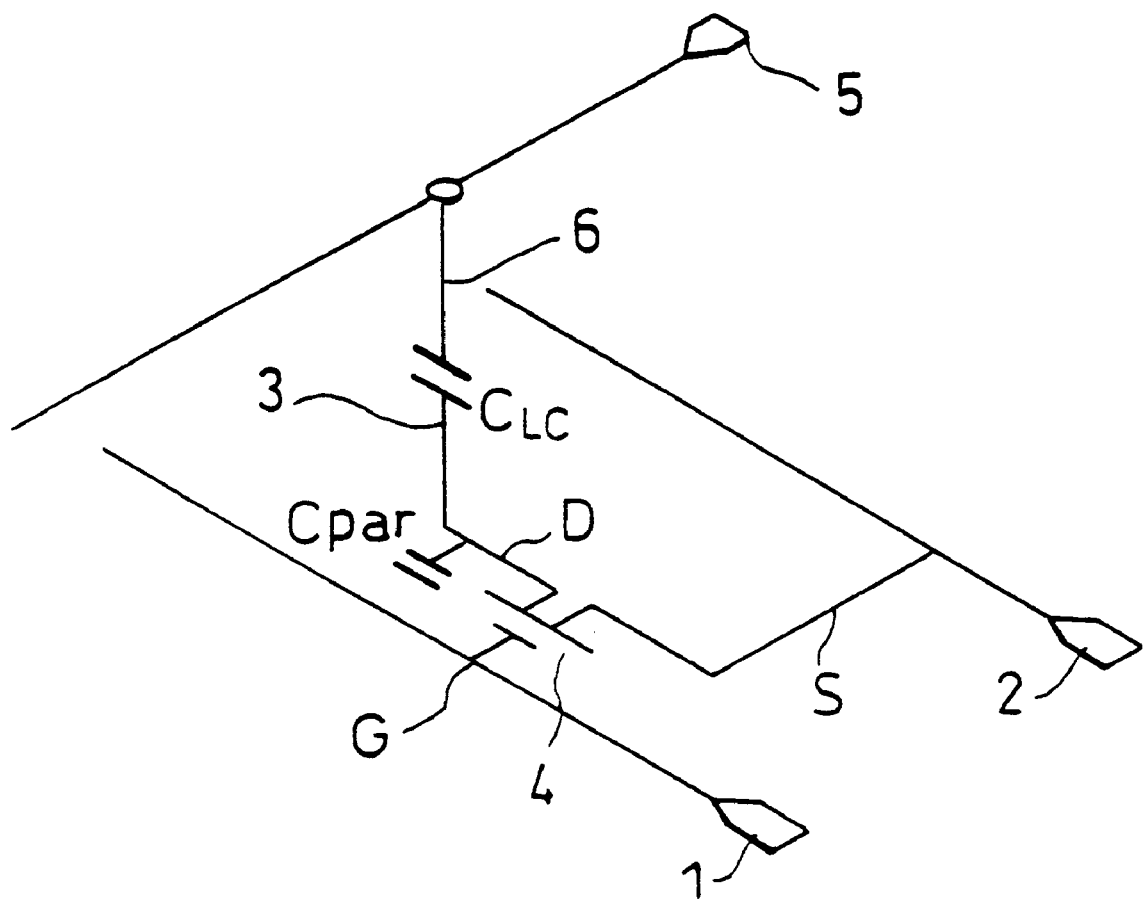

LIQUID CRYSTAL DISPLAY DEVICE

FIELD OF THE INVENTION

The present invention relates to a liquid crystal display device which uses thin-film transistors as switching elements, and in particular to a liquid crystal display device which uses a liquid crystal material which contributes to high image quality by preventing crosstalk and flicker.

BACKGROUND OF THE INVENTION

In thin-film transistor liquid crystal display devices (hereinafter referred to as "TFT-LCDs"), there has been a trend in recent years toward large-screen, high-definition devices. Further, in accompaniment with the development of multimedia, increasingly high display quality is required of such liquid crystal display devices.

FIG. 12 is an explanatory drawing showing a panel 100 structured as conventional TFT-LCD panels are generally structured. In the panel 100, a glass substrate 131 is provided with scanning lines 101, signal lines 105, and TFTs 104, and an electrode is provided across the entire surface of another glass substrate 132. On the lower substrate in FIG. 12, i.e., the glass substrate 131, the lines extending laterally are the scanning lines 101, and those extending longitudinally are the signal lines 105. The lines 101 and 105 intersect with one another, but are separated from each other by a very thin insulating layer. Each intersection creates a small capacitance, and due to the very large number of scanning lines 101 and signal lines 105, the total of these capacitances for the entire panel 100 is a value which cannot be ignored.

Signal delay due to these capacitances in the lines is especially serious in large-screen, high-definition devices, and there may not be enough time to charge the pixels sufficiently.

Further causes of reduced panel productivity are short circuits due to insufficient insulation between the lines 101 and 105 where they intersect, line breakage where the level of a line changes, etc.

In order to resolve the foregoing problems, the following documents, for example, propose a panel structure in which TFTs and scanning lines are provided on one glass substrate, and signal lines on the other glass substrate.

(1) J. F. Clerc, et al, "New Electrode Architectures for Liquid Crystal Displays Based on Thin Film Transistors," Japan Display '86.
(2) Kenichi OKI, et al, "Full Color Liquid Crystal Display Using a New Active Matrix," ITEJ Technical Report, Vol. 11, No. 27, pp. 73–78.
(3) Kenichi OKI et al, "Active Matrix Display Device" (Japanese Unexamined Patent Publication No. 62-133478/1987 (Tokukaisho 62-133478, published on Jun. 16, 1987)).

FIG. 10 is an explanatory drawing showing a panel 30 structured according to the foregoing documents. In the present Specification, this type of structure will be referred to as the "counter substrate signal line structure."

In the panel 30 of the counter substrate signal line structure, a TFT substrate 31 is provided with scanning lines 1, reference potential lines 2, and TFTs 4; and a counter substrate 32 is provided with counter substrate signal lines 5. Accordingly, in the present structure, the scanning lines 1 and the counter substrate signal lines 5 do not intersect on opposite sides of an insulating thin film. This greatly reduces the capacitances created by intersections if the scanning lines 1 and the counter substrate signal lines 5, and signal delay based on the time constant of the lines is greatly reduced. For this reason, the counter substrate signal line structure is more suited to large-screen, high-definition TFT-LCDs, for which signal delay is a serious problem. Further, since the lines do not intersect on a single substrate, the likelihood of the foregoing short circuits and line breakage is reduced, which can be expected to improve production efficiency.

However, in the foregoing TFT-LCDs, when TFTs of non-monocrystalline silicon are used for the switching elements, crosstalk is marked, and it is difficult to suppress shift of the direct-current component. These problems are more serious in TFT-LCDs having a counter substrate signal line structure than in those having line intersections, because they appear as more marked phenomena.

The following will explain crosstalk in detail.

First, FIG. 13 shows an equivalent circuit diagram corresponding to a single pixel in the panel 100 having line intersections, and FIG. 11 shows an equivalent circuit diagram corresponding to a single pixel in the panel 30 of the counter substrate signal line structure.

In FIGS. 11 and 13, $C_{LC}$ is a capacitance due to the pixel electrode (hereinafter referred to as "pixel capacitance"); $C_{gd}$ is a capacitance between the gate and drain of the TFT 4 or 104 (including a coupling capacitance between the signal line and the pixel electrode); and $C_{sd}$ is a capacitance between the source and drain of the TFT 4 or 104 (including a coupling capacitance between the line to which the source electrode S of the TFT 4 or 104 is connected and the pixel electrode). Here, the line to which the source electrode S of the TFT 4 or 104 is connected is a signal line 105 in the panel 100 having line intersections, or a reference potential line 2 in the panel 30 of the counter substrate signal line structure.

Here, since a voltage applied to the liquid crystal is determined by a charge $Q_{LC}$ (not shown) of the pixel electrode when the TFT 4 or 104 is OFF, it is preferable, when the TFT 4 or 104 is OFF, to maintain the charge $Q_{LC}$ as uniformly as possible.

In the panel 100 having line intersections, shown in FIG. 13, factors causing fluctuation of the charge $Q_{LC}$ of the pixel electrode during the OFF state are relative potentials of the scanning lines 101 and the signal lines 105 with respect to a common electrode potential ($V_{com}$). Of these, a potential difference between the common electrode potential ($V_{com}$) and the scanning line potential ($V_g$) can be held constant for all pixels. However, since signal line potential ($V_d$) is a potential which varies depending on the pattern to be displayed on the panel 100, it cannot be held constant for all pixels.

In the same way, in the panel 30 of the counter substrate signal line structure, shown in FIG. 11, factors causing fluctuation of a charge $Q_{LC}$ (not shown) of the pixel electrode during the OFF state are relative potentials of the scanning lines 1 and the reference potential lines 2 with respect to a potential ($V_d$) of the counter substrate signal lines 5. However, since the signal line potential ($V_d$) of the counter substrate signal lines 5 is a potential which changes depending on the display pattern, neither of the foregoing can be held constant.

Since the scanning line potential (hereinafter referred to as "gate line potential") $V_g$ and the reference potential line potential ($V_{ref}$) of each row are connected together at the corresponding TFTs 4, these cannot be changed in keeping with the signal line voltages ($V_d$) of each pixel.

Accordingly, in the panel 30 of the counter substrate signal line structure, neither of the relative voltages of the gate line potential ($V_g$) and the reference potential line potential ($V_{ref}$) with respect to the signal line voltage ($V_d$)

can be held constant. If values of the pixel capacitance $C_{LC}$, the capacitance $C_{gd}$ between the gate and drain of the TFT 4, and the capacitance $C_{sd}$ between the source and drain of the TFT 4 are assumed to be equal, then the panel 30 of the counter substrate signal 1—line structure can be said to have the following structurally inherent problem: "the extent to which fluctuation of pixel electrode potential is dependent on the pattern to be displayed on the panel is essentially greater than in the panel 100 having line intersections."

In the panel 100 having line intersections, as will be discussed below, it is structurally easy to form supplemental capacitances in order to relatively reduce fluctuation of the potential of the pixel electrode, and this also indicates that it is easier to obtain high display quality with this structure than with the panel 30 of the counter substrate signal line structure. Further, fluctuation of the potential of the pixel electrode is observed as, specifically, smear arising depending on the display pattern, i.e., staining and unevenness (crosstalk or shadowing). Here, "crosstalk" means a phenomenon in a matrix display in which the display of a given domain influences the display of other domains in the same column or row through a bypass, thus driving other display pixels. Further, "vshadowing" is a synonym for "crosstalk."

The following will explain why it is difficult to suppress shift of direct-current components.

Generally, at the conclusion of writing to a pixel, the signal of the scanning line changes from select to non-select, and the voltage thereof is applied to the pixel capacitance $C_{LC}$ via a parasitic capacitance $C_{par}$ of the TFT. As a result, immediately after writing, potential of the pixel is always subject to a negative shift of a quantity proportional to $C_{par}/(C_{LC}+C_{par})$. Normally, this negative shift can be compensated by adjusting the voltage which is used as a reference. However, since the dielectric constant of the liquid crystal changes depending on the effective voltage, the quantity of negative shift also changes, and it is not possible to compensate uniformly in-plane. With regard to display quality, this appears as a flicker component. Further, if the remaining direct-current component is large, staining and unevenness are likely to occur.

Consequently, in the panel 100 having line intersections, a supplemental capacitance $C_s$ is applied to reduce the dependence of the quantity of negative shift on the fluctuation in liquid crystal dielectric constant.

However, in the panel 30 of the counter substrate signal line structure, it is structurally very difficult to form a supplemental capacitance $C_s$, and it is difficult to suppress flicker.

SUMMARY OF THE INVENTION

The present invention was created in view of the foregoing problems with the conventional art, and it is an object hereof to provide a liquid crystal display device which uses a liquid crystal material having physical quantities set so as to contribute to high image quality by reducing crosstalk, flicker, and direct-current component shift.

In order to attain the foregoing object, a liquid crystal display device according to the present invention uses a liquid crystal material having an effective dielectric constant $\epsilon_P$ in the direction of the long axis and an effective dielectric constant $\epsilon_V$ in the direction of the short axis which, if $X=\epsilon_P+\epsilon_V$ and $Y=\epsilon_P\cdot\epsilon_V$, satisfy $Y=A\cdot X-B$ at a certain point in the ranges $9.55\leq X\leq15.5$, $5.43\leq A\leq5.75$, and $27\leq B\leq36.2$.

With the foregoing structure, crosstalk, flicker, and shift of the direct-current component can be reduced, and thus a liquid crystal display device can be realized which has high productivity and an image quality suitable for large-screen, high-definition devices.

Further, in order to attain the foregoing object, another liquid crystal display device according to the present invention uses a liquid crystal material having effective dielectric constants $\epsilon_P$ in the direction of the long axis and $\epsilon_V$ in the direction of the short axis which, if $X=\epsilon_P+\epsilon_V$ and $Y=\epsilon_P\cdot\epsilon_V$, satisfy $Y=A\cdot X-B$ at a certain point in the ranges $10.2\leq X\leq14.7$, $5.43\leq A\leq5.75$, and $27\leq B\leq36.2$.

With the foregoing structure, crosstalk, flicker, and shift of the direct-current component can be reduced with certainty, and thus a liquid crystal display device can be realized which has high productivity and an image quality suitable for large-screen, high-definition devices.

Further, in order to attain the foregoing object, a further liquid crystal display device according to the present invention uses a liquid crystal material having an effective dielectric constant $\epsilon_P$ in the direction of the long axis and an effective dielectric constant $\epsilon_V$ in the direction of the short axis which, if $X=\epsilon_P+\epsilon_V$ and $Y=\epsilon_P\cdot\epsilon_V$, satisfy $Y=A\cdot X-B$ at a certain point in the ranges $10.2\leq X\leq14.7$, $A=5.59$, and $B=32.02$.

With the foregoing structure, crosstalk, flicker, and shift of the direct-current component can be reduced with even greater certainty, and thus a liquid crystal display device can be realized which has high productivity and an image quality suitable for large-screen, high-definition devices.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 7 is an equivalent circuit diagram of the foregoing TFT-LCD having a counter substrate signal line structure.

DESCRIPTION OF THE EMBODIMENTS

The following will explain one embodiment of the present invention with reference to FIGS. 1 through 14.

Figure 10:
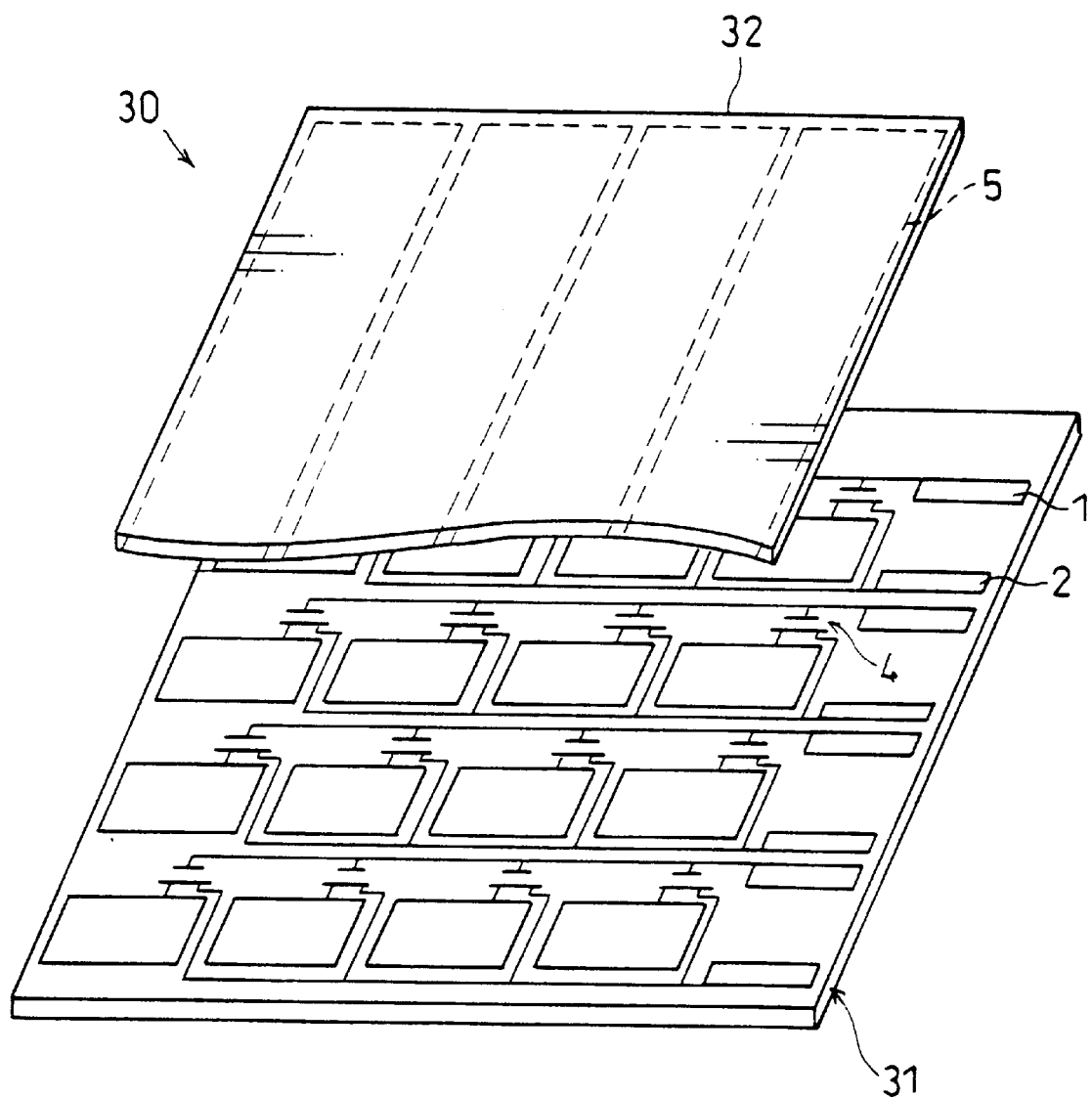
FIG. 10 is a drawing schematically showing a typical TFT-LCD having a counter substrate signal line structure.

As shown in FIG. 10, a liquid crystal display device according to the present embodiment is a panel 30 having a counter substrate signal line structure, made up of a pixel substrate including TFTs 4 (3-terminal switching elements) arranged in matrix form, scanning lines 1, each connected to the first terminals of the TFTs 4 of one column, reference potential lines 2, each connected to the second terminals of the TFTs 4 of one column, and pixel electrodes, each connected to the third terminal of one TFT 4; a counter substrate 32 positioned 1-opposite the pixel substrate, including counter electrodes opposite each of the pixel electrodes, and counter substrate signal lines 5 (signal lines) which connect the counter electrodes of each row; and liquid crystal sandwiched between the pixel substrate and the counter substrate 32.

Further, in the present liquid crystal display device, the switching elements are TFTs having a channel length of 6 μm or less, and the liquid crystal is a liquid crystal material having effective dielectric constants $\epsilon_P$ in the direction of the long axis and $\epsilon_V$ in the direction of the short axis which, if $X=\epsilon_P+\epsilon_V$ and $Y=\epsilon_P\cdot\epsilon_V$, satisfy $Y=A\cdot X-B$ at a certain point in the ranges $9.5 \leq X \leq 15.5$, $5.43 \leq A \leq 5.75$, and $27 \leq B \leq 36.2$.

The necessity for the foregoing parameters will be explained in what follows.

First, the following will quantitatively evaluate direct-current components remaining after conclusion of writing to a pixel, and fluctuation in potential of a pixel electrode (crosstalk) when maintaining a pixel charge.

Here, the phenomenon of direct-current components remaining after conclusion of writing to a pixel is a fluctuation in pixel potential due to the influence of the sum of a parasitic capacitance $C_{TFT}^{on}$ between the gate and drain and a lateral electrical field capacitance $C_{gd}^{lat}$ between the gate and drain, and the influence of a divided capacitance of a pixel capacitance $C_{LC}$ on transition in the gate potential $V_g$ (shown in FIG. 11) at the time of conclusion of writing, i.e., the transition from ON to OFF.

Figure 11:
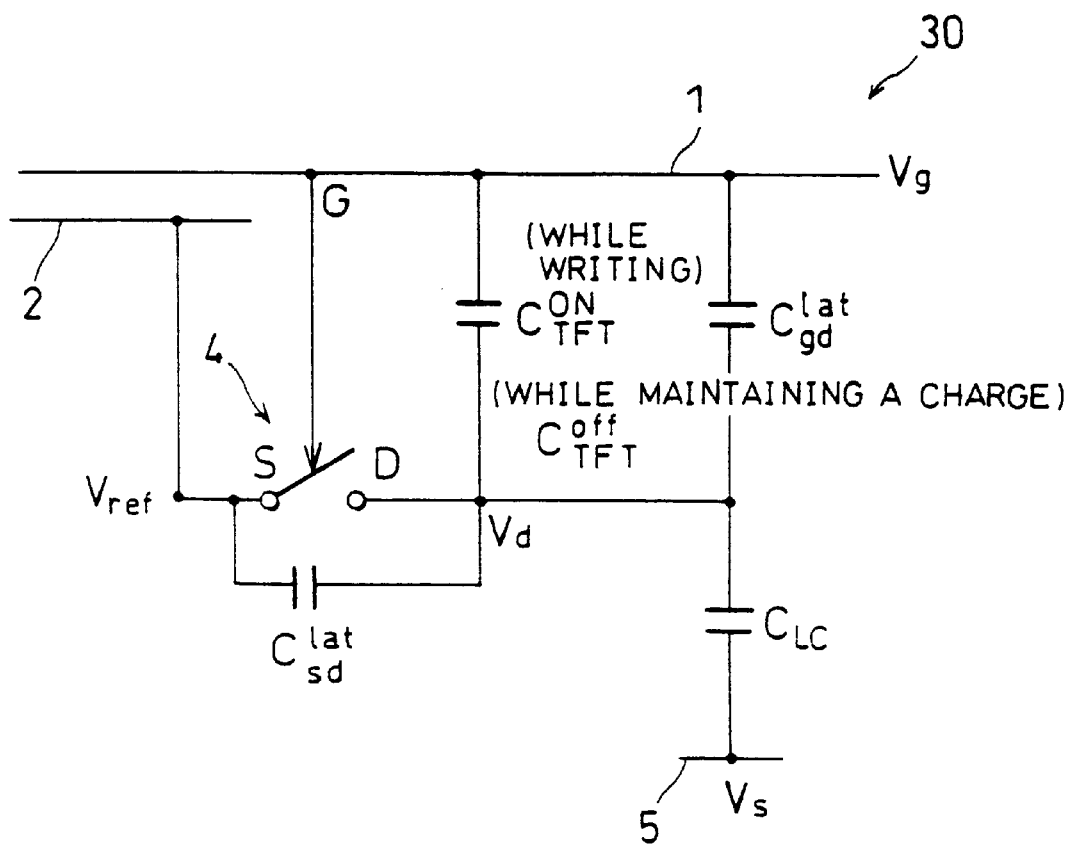
FIG. 11 is an equivalent circuit diagram of one pixel of the foregoing TFT-LCD having a counter substrate signal line structure.

Further, the phenomenon of fluctuation in potential of a pixel electrode when maintaining a pixel charge is a fluctuation in pixel potential due to the influence of the sum of a parasitic capacitance $C_{TFT}^{off}$ between the gate and drain and a lateral electrical field capacitance $C_{sd}^{lat}$ between the reference potential line and the drain, and due to the influence of a divided capacitance of a pixel capacitance $C_{LC}$ on transition in the source potential $V_s$ (shown in FIG. 11).

The respective capacitances above are derived as follows.

First, as shown in FIGS. 3(a) and 3(b), if L is a channel length, W is a channel width, ΔL is an overlap length between a gate electrode G and a drain electrode (pixel electrode) D (more precisely, between the gate electrode G and a contact layer 10), and $C_{ox}$ is a capacitance per unit surface area of a gate insulating film 8, then a parasitic capacitance $C_{TFT}^{on}$ between the gate and drain of the TFT 4 during writing to the pixel and a parasitic capacitance $C_{TFT}^{off}$ between the gate and drain of the TFT 4 when maintaining the pixel charge (shown in FIG. 11) are as shown in Equations (1) and (2).

$$C_{TFT}^{on}=(L/2+\Delta L)\cdot W\cdot C_{ox} \quad (1)$$

$$C_{TFT}^{off}=\Delta L\cdot W\cdot C_{ox} \quad (2)$$

Accordingly, in the counter substrate signal line structure, a parasitic capacitance $C_{par}^{on}$ connected to the drain electrode (pixel electrode) D during writing to the pixel and a parasitic capacitance $C_{par}^{off}$ connected to the drain electrode D when maintaining the pixel charge are as shown in Equations (3) and (4).

$$\begin{aligned} C_{par}^{pn} &= C_{TFT}^{on} + C_{gd}^{lat} \\ &= \left(\frac{L}{2}+\Delta L\right)\cdot W\cdot C_{ox} + C_{gd}^{lat} \end{aligned} \quad (3)$$

$$\begin{aligned} C_{par}^{off} &= C_{TFT}^{off} + C_{sd}^{lat} + C_{gd}^{lat} \\ &= \Delta L\cdot W\cdot C_{ox} + C_{sd}^{lat} + C_{gd}^{lat} \end{aligned} \quad (4)$$

In evaluating the fluctuation in potential of the drain electrode (pixel electrode) D when maintaining the pixel charge, in the present structure, this pixel electrode potential fluctuation is determined by (a) a quantity of potential fluctuation between the counter substrate signal lines 5 on the counter substrate and the scanning lines 1 and the reference potential lines 2 on the TFT substrate 31, and (b) a capacitance ratio between the pixel capacitance $C_{LC}$ and parasitic capacitances between the pixel (drain) and the scanning lines and between the pixel and the reference potential lines.

In the panel 100 having line intersections, in contrast, the fluctuation in potential of the drain electrode (pixel electrode) D is determined by (a) a quantity of potential fluctuation between a common-potential electrode (corresponding to the reference potential lines of the present structure) on the counter substrate and the signal lines on the glass substrate 131, and (b) a capacitance ratio between the pixel capacitance and parasitic capacitance between the pixel (drain) and the signal lines.

Accordingly, in the panel 100 having line intersections, the parasitic capacitance $C_{TFT}^{off}$ between the gate and drain when maintaining the pixel charge, and a lateral electrical field capacitance $C_{gd}^{lat}$ between the gate and drain, can be deleted from Equation (4) above. This is the difference from the panel 30 having a counter substrate signal line structure.

Next, when $P_L$ and $P_S$ are pixel pitches on long and short sides of the pixels, γ is aperture rate, $\epsilon_P$ and $\epsilon_V$ are effective dielectric constants of the liquid crystal in long-axis and short-axis directions (values measured in a standard cell), $\epsilon_0$ is dielectric constant in a vacuum, and $T_{sel}$ is cell thickness, then a pixel capacitance $C_{LC(P)}$ and a pixel capacitance $C_{LC(V)}$ are as shown by Equations (5) and (6).

$$C_{LC(P)} = \gamma\cdot P_L\cdot P_S\varepsilon_0\cdot\frac{\varepsilon_P}{T_{sel}} \quad (5)$$

$$C_{LC(V)} = \gamma\cdot P_L\cdot P_S\varepsilon_0\cdot\frac{\varepsilon_V}{T_{sel}} \quad (6)$$

Here, dielectric constant in the direction of the long axis is shown as (dielectric constant $\epsilon_P$ in long-axis direction)×(dielectric constant $\epsilon_0$ in vacuum), and dielectric constant in the direction of the short axis is shown as (dielectric constant $\epsilon_V$ in short-axis direction)×(dielectric constant $\epsilon_0$ in vacuum).

Further, the dielectric constants $\epsilon_P$ and $\epsilon_V$ in the directions of the long and short axes, respectively, are defined as follows.

Figure 14:
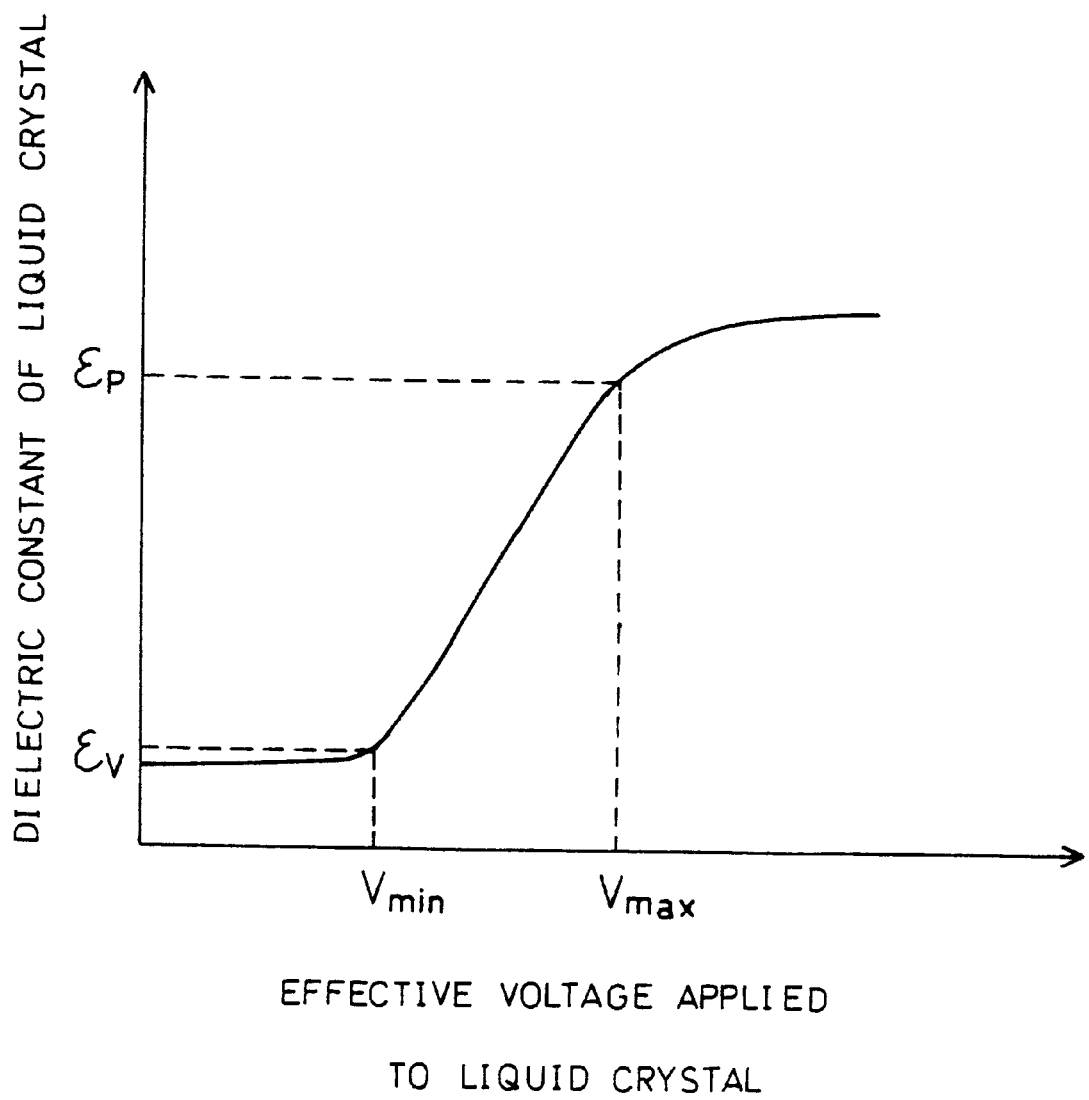
FIG. 14 is an explanatory drawing showing a relationship between an effective voltage applied to liquid crystal and dielectric constant of the liquid crystal.

Since, in typical TN (twisted nematic) liquid crystal materials, (dielectric constant $\epsilon_P$ in long-axis direction)> (dielectric constant $\epsilon_V$ in short-axis direction), a relationship between an effective voltage applied to the liquid crystal and dielectric constant of the liquid crystal is as shown in FIG. 14. Accordingly, in actual driving, if minimum and maximum values of effective voltage applied to the liquid crystal are $V_{min}$ and $V_{max}$, respectively, the dielectric constant of the liquid crystal during application of $V_{min}$ is the dielectric constant $\epsilon_V$ in the direction of the short axis, and its dielectric constant during application of $V_{max}$ is the dielectric constant $\epsilon_P$ in the direction of the long axis.

Since, as explained above, TN (twisted nematic) liquid crystal materials generally have positive anisotropy of the dielectric constant $\Delta\epsilon = \epsilon_P - \epsilon_V$, the following Equation (7) holds true.

$$C_{LC(P)} > C_{LC} > C_{LC(V)} \tag{7}$$

In other words, the pixel capacitance $C_{LC}$ is greater than the pixel capacitance $C_{LC(V)}$, and less than the pixel capacitance $C_{LC(P)}$.

Incidentally, in liquid crystal materials designed for perpendicular alignment, anisotropy of the dielectric constant $\Delta\epsilon = \epsilon_P - \epsilon_V$ is negative, and thus the order of the foregoing inequality is reversed.

The following will derive conditions for limiting various parameters, which are determined by writing characteristics.

If $\mu$ is field effect mobility of the TFT 4, $V_{gh}$ is a writing potential for the scanning lines, $V_{th}$ is a threshold voltage of the TFT 4, $V_s$ is a source potential, and $V_d$ is a signal line potential (hereinafter referred to as "drain potential"), then, when $V_s < V_d$, an ON current of the TFT 4 can be fairly closely approximated by a current equation of a line-shaped domain of a MOS (metal oxide semiconductor) transistor, as shown in Equation (8).

$$I_{on} = W/L \cdot C_{ox} \cdot \mu \cdot ((V_{gh} - V_s - V_{th}) \cdot (V_d - V_s) - \tfrac{1}{2} \cdot (V_d - V_s)^2) \tag{8}$$

Incidentally, when $V_s > V_d$, it is sufficient to use an equation obtained by exchanging the drain potential $V_d$ and the source potential $V_s$ of Equation (8).

Further, actual TFT-LCD driving conditions in line inversion driving are such that the scanning line writing potential $V_{gh}$ is 15V, and a potential $V_{ds}$ between the source and drain ($= |V_s - V_d|$) is around 5V at most. For this reason, during most of the pixel writing period, the potential $V_{ds}$ between the source and drain is sufficiently small in comparison to a potential $V_{gs}$ between the source and gate ($= V_{gh} - V_s$). Accordingly, a transfer conductance g can be approximated by Equation (9).

$$g = \frac{\partial I_{on}}{\partial V_{ds}} = \frac{W}{L} \cdot C_{ox} \cdot \mu \cdot (V_{gh} - V_s - V_{th}) \tag{9}$$

Here, since an ON resistance Ron of the TFT 4 is the 1-inverse of the transfer conductance g, it is as shown by Equation (10).

$$R_{on} = \frac{1}{g} = \frac{L}{W \cdot C_{ox} \cdot \mu \cdot (V_{gh} - V_s - V_{th})} \tag{10}$$

Figure 4:
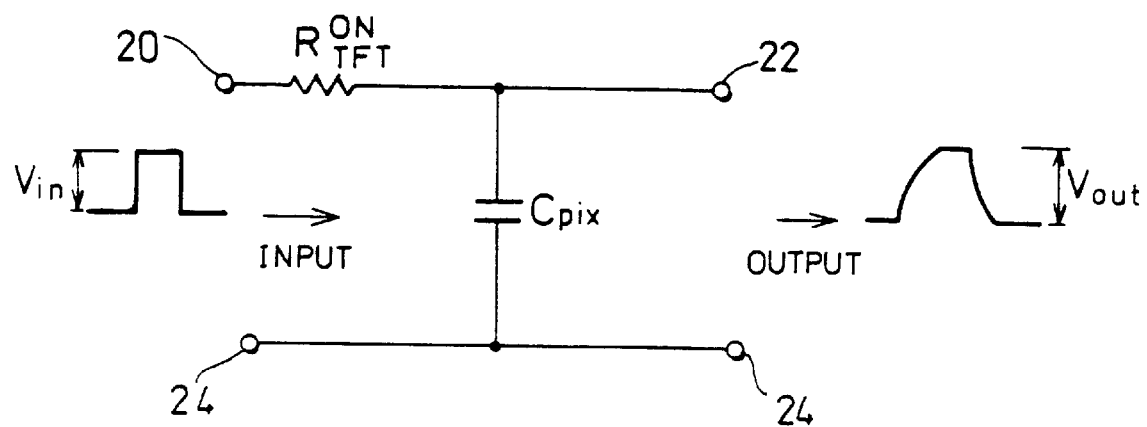
FIG. 4 is a circuit diagram showing an integration circuit in the foregoing liquid crystal display device.

The transistor array of the TFT-LCD, as shown in FIG. 4, is equivalent to an integration circuit (an input between the source electrode 20 of the TFT 4 and the common potential electrode 24 (or the reference potential line 2) and an output between the pixel electrode 22 and the common potential electrode 24 (or the source electrode on the counter substrate)) made up of a TFT resistance RTFT and a pixel capacitance $C_{pix}$, and when a rectangular wave having a voltage value of $V_{in}$ is inputted to this integration circuit, an output voltage value $V_{out}$ is as shown in Equation (11).

$$V_{out} = V_{in}\left(1 - \exp\left(-\frac{t}{R_{TFT} \cdot C_{pix}}\right)\right) \tag{11}$$

Here, t is time, with zero set at the time of input of the rectangular wave. Further, in Equation (11) above, $R_{TFT} \cdot C_{pix}$ (which is the product of the resistance $R_{TFT}$ of the TFT and the pixel capacitance $C_{pix}$) will be referred to as a time constant $\tau$.

Next, a time constant $\tau_{on}$ during writing to the pixel will be discussed.

At its maximum, the time constant $\tau_{on}$ during writing to the pixel is as shown in Equation (12).

$$\tau_{on} = R_{on} \cdot (C_{LC(P)} + C_S) \tag{12}$$

The foregoing is the case when anisotropy of the dielectric constant is positive. However, when anisotropy of the dielectric constant is negative, the foregoing discussion can be applied if the dielectric constant $\epsilon_P$ in the long-axis direction and the pixel capacitance $C_{LC(P)}$ are replaced with the dielectric constant $\epsilon_V$ in the short-axis direction and the pixel capacitance $C_{LC(V)}$.

Further, $C_S$ is a supplementary capacitance. In the present structure, since formation of a supplementary capacitance $C_S$ is difficult, $C_S$ is considered to be equal to zero.

When writing conditions are strict, the source potential $V_s \approx 0$, and in this case, based on Equations (5), (10), and (12) above, $\tau_{on}$ is as shown in Equation (13).

$$\tau_{on} = \frac{L}{W \cdot C_{ox} \cdot \mu \cdot (V_{gh} - V_{th})} \cdot P_L \cdot P_S \cdot \gamma \cdot \frac{\varepsilon_0 \cdot \varepsilon_P}{T_{cel}} \tag{13}$$

If $\tau_W$ is time allowed for writing, then in order to charge the pixel to at least 99.7%, $\tau_W$ is as shown in Equation (14).

$$0.997 \leq 1 - \exp\left(\frac{\tau_W}{\tau_{on}}\right) \tag{14}$$

Solving Equation (14) yields Equation (15).

$$5.8 \cdot \tau_{on} \leq \tau_W \tag{15}$$

In the discussion above, the proportion of charging of the pixel was set to at least 99.7% to satisfy conditions under which gray-scale inversion does not occur in 64-gray-shade display. Thus the value adopted is one generally called for in order to perform gray-scale inversion which is not noticeable to the human eye. Further, the foregoing conditions are those in the case of 6 bits, thus requiring charging of at least 99.7%, but in the case of 3 bits, this value can be somewhat reduced to, say, 99.4%.

Accordingly, in the case of 3 bits, the conditions of the calculations in Equation (14) and thereafter can be somewhat relaxed.

In the case of 3 bits, if the proportion of charging of the pixel is set to at least 99.7%, then application to more than 64 gray scales becomes possible.

Next, in the case of, for example, 60 Hz driving, if $N_g$ is the number of scanning lines, then, since sequential line driving is used, the time $\tau_W$ allowed for writing to the pixel in Equation (15) above is as shown in Equation (16).

$$\tau_W = \frac{16 \text{ msec}}{N_g} \quad (16)$$

For example, in the case of the SVGA (Super Video Graphics Array), which is a standard IBM Co. panel, since the number $N_g$ of scanning lines is 600, then the time $\tau_W$ allowed for writing to each pixel≈26 μs. With the XGA (Extended Video Graphics Array), also a standard IBM Co. panel, since the number $N_g$ of scanning lines is 768, then the time $\tau_W$ allowed for writing to each pixel≈20 μs.

However, since actual scanning and source signals are not ideal rectangular waves, the time $\tau_W$ allowed for writing to each pixel must be given some margin. Consequently, it is somewhat shortened.

In what follows, the foregoing SVGA and XGA will be treated as measures of resolution.

Next, conditions limiting the various capacitances will be derived.

When $V_g^{pp}$ is a pulse peak of the scanning signal, and $C_{LC}$ is pixel capacitance, a direct-current component quantity $\Delta V$ remaining after completion of writing to the pixel is as shown in Equation (17).

$$\Delta V = \frac{C_{par}^{on}}{C_{par}^{on} + C_{LC}} \times V_g^{pp} \quad (17)$$

Here, since the pixel capacitance $C_{LC}$ is dependent on applied voltage, the direct-current component quantity $\Delta V$ remaining after completion of writing to the pixel is also dependent on applied voltage.

Accordingly, a maximum value $\Omega$ of a quantity of shift in the direct-current component quantity $\Delta V$ can be calculated from the dependence of the pixel capacitance $C_{LC}$ on applied voltage and from Equation (7) above, and is as shown in Equation (18).

$$\Omega = \left( \frac{C_{par}^{on}}{C_{par}^{on} + C_{LC(V)}} - \frac{C_{par}^{on}}{C_{par}^{on} + C_{LC(P)}} \right) \times V_g^{pp} \quad (18)$$

Since flicker is marked when the maximum value $\Omega$ of the quantity of shift is large, experience indicates that the maximum value $\Omega$ of the quantity of shift must be held to no more than a certain value ω. Consequently, Equation (19) must be satisfied.

$$\Omega \leq \omega \quad (19)$$

A parameter $\Psi$ showing fluctuation of potential of the pixel electrode when maintaining the pixel charge, i.e., showing crosstalk, is defined in Equation (20).

$$\Psi = \frac{C_{par}^{off}}{\frac{C_{LC(P)} + C_{LC(V)}}{2} + C_{par}^{off}} \quad (20)$$

Experience also indicates that the parameter $\Psi$ must be held to no more than a value ψ, and accordingly Equation (21) must be satisfied.

$$\Psi \leq \psi \quad (21)$$

To summarize the foregoing discussion, in order to (a) suppress flicker due to dependence on fluctuation of the dielectric constant of the liquid crystal, (b) suppress crosstalk due to parasitic capacitance coupling, and (c) reduce shift in the direct-current component, it is necessary to simultaneously satisfy each of the following inequalities.

(I) An inequality derived from Equations (21), (4), (5), and (6) (crosstalk);
(II) An inequality derived from Equations (19), (18), (3), (5), and (6) (direct-current component shift); and
(III) An inequality derived from Equations (15), (16), and (14) (writing characteristics).

Since flicker is due to insufficient writing and large shift of the direct-current component, flicker can be suppressed by satisfying (II) and (III) above.

In order to satisfy the foregoing conditions, it is sufficient to simultaneously satisfy Equations (14), (19), and (21).

Here, assume that ω=0.6 and that ψ=0.05. These values are constants which are generally fixed.

Figure 1:
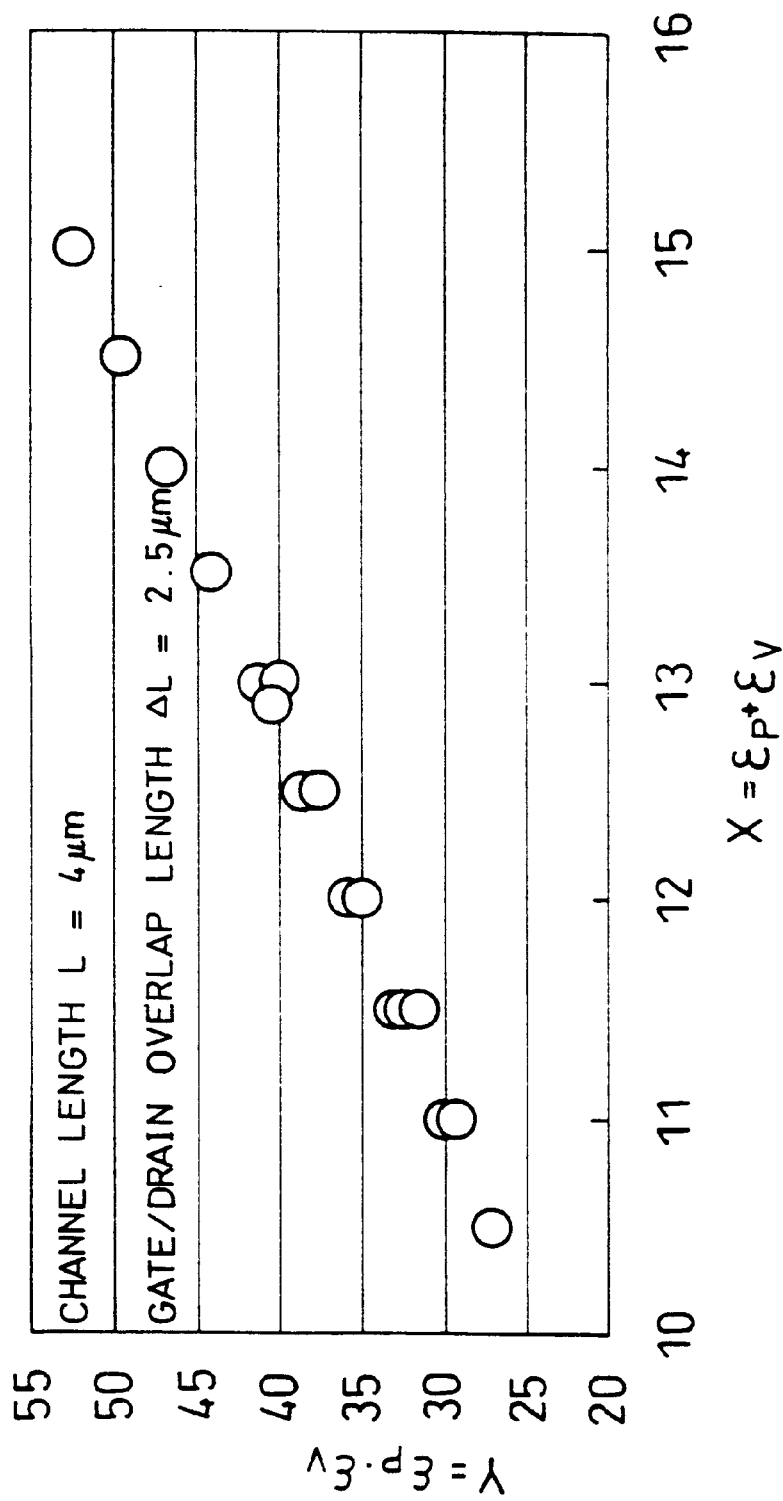
FIG. 1 is a graph showing, in a liquid crystal display device according to one embodiment of the present invention, a relationship between $\epsilon_P+\epsilon_V$ and $\epsilon_P\cdot\epsilon_V$ when a channel length L is set to 4 μm.

The following will consider the case of a 13.3-inch panel having a resolution equivalent to that of an XGA. In this case, pixel pitch is 88 μm×264 μm. Channel length L of the TFT 4 is 4 μm, which is the smallest channel length currently attainable in mass production. With these parameters, the dielectric constant $\epsilon_P$ in the long-axis direction and the dielectric constant $\epsilon_V$ in the short-axis direction are as shown in FIG. 1, which is a graph whose horizontal axis is $\epsilon_P + \epsilon_V$, and whose vertical axis is $\epsilon_P \cdot \epsilon_V$ (meaning $\epsilon_P \times \epsilon_V$). Incidentally, the cell thickness $T_{sel}$ is 4.5 μm. Further, channel width W is 8 μm, and overlap length $\Delta L$ is 2.5 μm. Further, the color filter is assumed to have a stripe arrangement.

As shown by FIG. 1, it was found that when $X = \epsilon_P + \epsilon_V$ and $Y = \epsilon_P \cdot \epsilon_V$, X and Y have the following relationship.

$$Y - 5.66X = -32.7 \pm 1.2 \ (9.5 \leq X \leq 15.5)$$

Incidentally, FIG. 1 shows points for the range $10.5 \leq X \leq 15.5$, but the foregoing equation is also true in the range $9.5 \leq X \leq 15.5$, as is clear from an equation based on the least squares method.

In other words, the following relationship holds true.

$$Y - A \cdot X = -B' \pm \text{error (provided that } \alpha \leq X \leq \beta)$$

Next, with the conditions of cell thickness $T_{sel} = 4.5$ μm, channel width W=8 μm, and overlap length $\Delta L = 2.5$ μm, calculations were performed for panels of various sizes and resolutions, yielding the results shown in Table 1 below. It was found that in every case, X and Y have a linear relationship like that shown in FIG. 1.

Then, it was found that if effective dielectric constants of these liquid crystal materials were shown as the dielectric constant $\epsilon_P$ in the long-axis direction and the dielectric constant $\epsilon_V$ in the short-axis direction, and if $X = \epsilon_P + \epsilon_V$ and $Y = \epsilon_P \cdot \epsilon_V$, that $Y = A \cdot X - B$ can be satisfied at a certain point in the ranges $9.5 \leq X \leq 15.5$, $5.43 \leq A \leq 5.75$, and $27 \leq B \leq 36.2$.

TABLE 1

(CELL THICKNESS = 4.5 μm)

| W/L = 8/4 (μm) | PIXEL PITCH (μm) | PANEL SIZE (DIAG. IN.) | A | B' | COEFFICIENT OF DETERMINATION | α | β | ERROR (3σ) |
|---|---|---|---|---|---|---|---|---|
| UXGA | 300 | 23.5 | 5.58 | 32 | 0.982 | 10 | 13.5 | 1.46 |
|  | 267 | 21 | 5.61 | 32.2 | 0.995 | 10.5 | 16 | 1.55 |
| SXGA | 300 | 20 | 5.56 | 31.9 | 0.983 | 10 | 14.5 | 1.39 |
|  | 264 | 17 | 5.66 | 32.7 | 0.996 | 10.5 | 15 | 1.39 |
|  | 240 | 15.5 | 5.75 | 33.7 | 0.992 | 12 | 14 | 1.10 |
| XGA | 300 | 15.1 | 5.5 | 31.1 | 0.991 | 10 | 15.5 | 2.46 |
|  | 264 | 13.3 | 6.66 | 32.7 | 0.996 | 10 | 15 | 1.20 |
|  | 240 | 12.1 | 5.75 | 33.7 | 0.992 | 12 | 14 | 2.46 |
| SVGA | 315 | 12.1 | 5.49 | 31.2 | 0.985 | 10 | 15.5 | 3.09 |
|  | 287 | 11.3 | 5.57 | 31.9 | 0.991 | 10 | 15.5 | 1.92 |
|  | 264 | 10.4 | 5.62 | 32.3 | 0.996 | 10 | 15.5 | 1.52 |

In Table 1, a minimum value of α is 10 and a maximum value of β is 15.5. Consequently, since $10 \leq X \leq 15.5$, then $9.5 \leq X \leq 15.5$ is satisfied. Further, since $5.49 \leq A \leq 5.75$, then $5.43 \leq A \leq 5.75$ is satisfied. Further, since the minimum value of B (B'−3σ) is 31.2−3.09=28.11 (with resolution of SVGA and pixel pitch of 315 μm), and the maximum value of B (B'+3σ) is 33.7+2.46=36.16≈36.2 (with a resolution of XGA and pixel pitch of 240 μm), then $27 \leq B \leq 36.2$ is satisfied.

The following will explain in detail how each of the items in Table 1 above is calculated.

The items in table 1 were calculated by the method of least squares. In the method of least squares, an estimated regression equation is as shown in Equation (22).

$$\hat{y} = \hat{\alpha} + \hat{\beta} x \quad (22)$$

Here, one measure of the extent to which fluctuation in measured values can be explained by the regression equation is defined as in Equation (23).

$$r^2 = 1 - \frac{\sum_{i=l}^{n} \hat{u}_i^2}{\sum_{i=l}^{n} (y_i - \bar{y})^2} \quad (23)$$

Here, $r^2$ is called a "coefficient of determination" or "ratio of contribution to regression." Further, $\hat{\alpha}$, $\hat{\beta}$, and $$\sum_{i=l}^{n} \hat{u}_i^2$$

are as defined in Equation (24).

$$\Sigma(y_i - \bar{y})^2 = \Sigma(\hat{y}_i + \hat{u}_i - \bar{y})^2 \quad (24)$$
$$= \Sigma(\hat{y}_i - \bar{y})^2 + \Sigma \hat{u}_i^2 + 2\Sigma \hat{u}_i (\hat{y}_i - \bar{y})$$
$$= \Sigma(\hat{y}_i - \bar{y})^2 + \Sigma \hat{u}_i^2 = \Sigma(\hat{y}_i - \bar{y})^2 + \Sigma \hat{u}_i^2$$

$$\because \Sigma \hat{u}_i (\hat{y}_i - \bar{y}) = \Sigma \hat{u}_i (\hat{\alpha} + \hat{\beta} x_i) - \bar{y} \Sigma \hat{u}_i$$
$$= \hat{\alpha} \Sigma \hat{u} - \bar{y} \Sigma \hat{u}_i + \hat{\beta} \Sigma x_i \hat{u}_i = 0$$

$$\hat{y} = \frac{1}{n} \Sigma \hat{y}_i = \frac{1}{n} \Sigma (\hat{\alpha} + \hat{\beta} x_i) = \hat{\alpha} + \hat{\beta} \bar{x} = \bar{y}$$

Accordingly, $r^2$ is as shown in Equation (25), which shows $r^2$ as a ratio expressing the extent to which the regression equation can explain the sum of squares of deviations from the mean of $y_i$.

$$r^2 = \frac{\sum_{i=l}^{n}(y_i - \bar{y})^2 - \sum_{i=l}^{n} \hat{u}_i^2}{\sum_{i=l}^{n}(y_i - \bar{y})^2} = \frac{\sum_{i=l}^{n}(\hat{y}_i - \bar{y})^2}{\sum_{i=l}^{n}(y_i - \bar{y})^2} \quad (25)$$

This coefficient of determination can be rewritten as in Equation (26).

$$\hat{y}_i - \bar{y} = \hat{\alpha} + \hat{\beta} x_i - \hat{\alpha} - \hat{\beta} \bar{x} = \hat{\beta}(x_i - \bar{x}) \quad (26)$$

From Equation (26), Equation (27) can be obtained.

$$r^2 = \frac{\hat{\beta}^2 \sum_{i=l}^{n}(x_i - \bar{x})^2}{\sum_{i=l}^{n}(y_i - \bar{y})^2} = \frac{\left\{\sum_{i=l}^{n}(x_i - \bar{x})(y_i - \bar{y})\right\}^2}{\sum_{i=l}^{n}(x_i - \bar{x})^2 \sum_{i=l}^{n}(y_i - \bar{y})^2} \quad (27)$$

Then, finding a square root, the relationship in Equation (28) can be obtained.

$$r = \frac{\sum_{i=l}^{n}(x_i - \bar{x})(y_i - \bar{y})}{\sqrt{\sum_{i=l}^{n}(x_i - \bar{x})^2 \sum_{i=l}^{n}(y_i - \bar{y})^2}} \quad (28)$$

The r defined as above is called a "correlation coefficient." In other words, the square of the correlation coefficient is the coefficient of determination.

Further, in Table 1, 3σ shows an apparent reliability of 3 times a standard deviation σ indicating deviation from a mean value in a statistical quantity, and shows an apparent reliability of 99.7%.

The foregoing explains the various items in Table 1.

Figure 2:
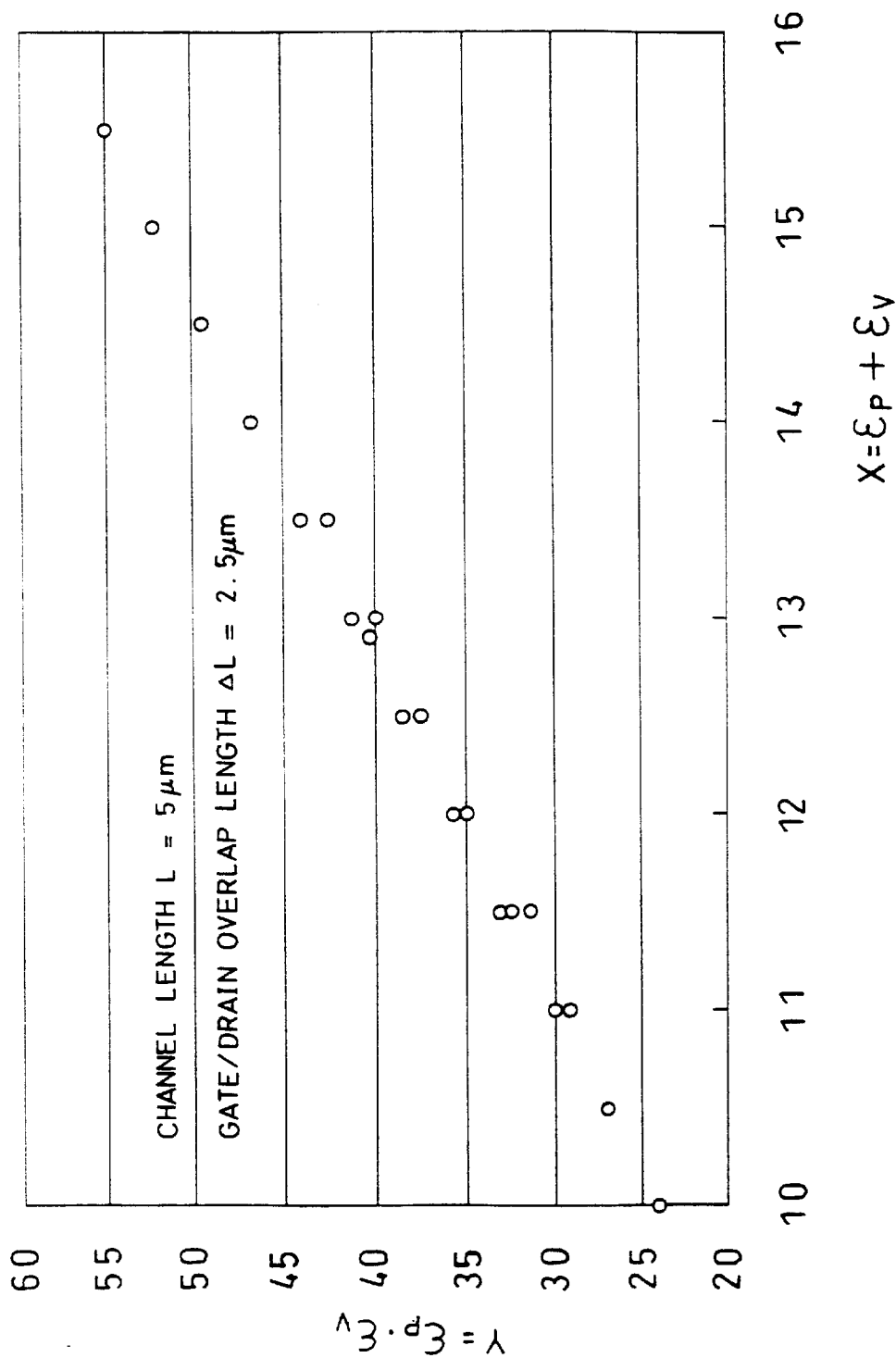
FIG. 2 is a graph showing, in the foregoing liquid crystal display device, a relationship between $\epsilon_P+\epsilon_V$ and $\epsilon_P\cdot\epsilon_V$ when the channel length L is set to 5 μm.
Figure 3:
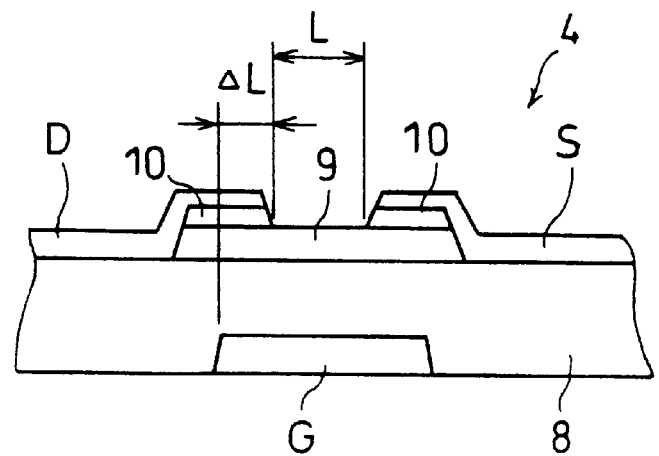
FIG. 3(a) is a cross-sectional view showing a typical amorphous silicon TFT of the reverse-stagger type.
FIG. 3(b) is a plan view of the TFT shown in FIG. 3(a).
Figure 3:
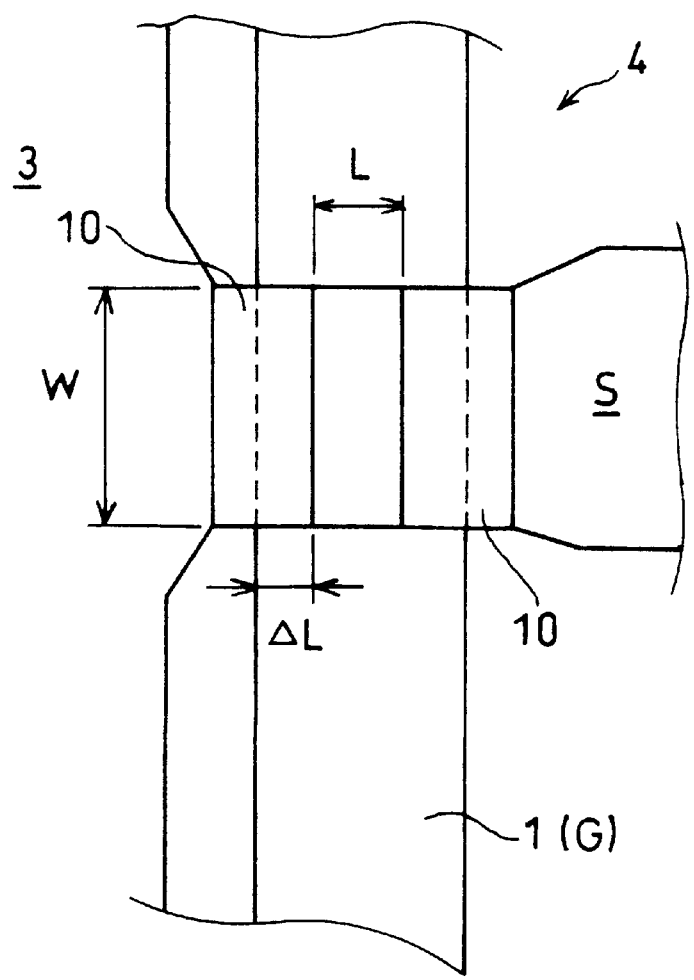

Next, in the same way as above, with ω=0.6 and ψ=0.05, in the case of a 13.3-inch panel having a resolution of XGA, an overlap length ΔL of 2.5 μm, and channel length L of the TFT 4 of 5 μm, the graph shown in FIG. 2 was prepared, whose horizontal axis is $\epsilon_P + \epsilon_V$, and whose vertical axis is $\epsilon_P \cdot \epsilon_V$. The cell thickness $T_{sel}$ was 4.5 μm, and the channel width W was 10 μm.

FIG. 2 yields the following relationship.

$$Y-5.6X=-31.7\pm1.04 \ (9.5\leq X\leq 15.5)$$

Next, with the conditions of cell thickness $T_{sel}$=4.5 μm, channel width W=10 μm, overlap length ΔL=2.5 μm, and channel length L=5 μm, calculations were performed for panels of various sizes and resolutions, yielding the results shown in Table 2 below. It was found that in every case, X and Y have a linear relationship like that shown in FIG. 2.

However, dashes in Table 2 indicate that the panel did not operate, i.e., that Equations (14), (19), and (21) were not simultaneously satisfied.

Accordingly, it was found that if effective dielectric constants of these liquid crystal materials were shown as the dielectric constant $\epsilon_P$ in the long-axis direction and the dielectric constant $\epsilon_V$ in the short-axis direction, and if X=$\epsilon_P$+$\epsilon_V$ and Y=$\epsilon_P$·$\epsilon_V$, that Y=A·X−B can be satisfied at a certain point in the ranges $9.5\leq X\leq 15.5$, $5.43\leq A\leq 5.75$, and $27\leq B\leq 36.2$.

In Table 3, W/L is shown as 12/4, indicating a channel width W of 12. This value was calculated as follows: 8 μm (channel width W)×4.5 μm (cell thickness $T_{sel}$)/3 μm (cell thickness $T_{sel}$)=12 μm. In other words, channel width W was calculated in inverse proportion to cell thickness $T_{sel}$.

In Table 3, it was found that when effective dielectric constants of these liquid crystal materials were shown as the dielectric constant $\epsilon_P$ in the long-axis direction and the dielectric constant $\epsilon_V$ in the short-axis direction, and if X=$\epsilon_P$+$\epsilon_V$ and Y=$\epsilon_P$·$\epsilon_V$, that Y=A·X−B can be satisfied at a certain point in the ranges $9.5\leq X\leq 15.5$, $5.43\leq A\leq 5.75$, and $27\leq B\leq 36.2$.

In other words, in Table 3, a minimum value of α is 9.5 and a maximum value of β is 15.5. Consequently, since $9.5\leq X\leq 15.5$, then $9.5\leq X\leq 15.5$ is satisfied. Further, since $5.43\leq A\leq 5.62$, then $5.43\leq A\leq 5.75$ is satisfied. Further, since the minimum value of B (B'−3σ) is 30.7−3.69=27.01≈27 (with resolution of SVGA and pixel pitch of 315 μm), and the maximum value of B (B'+3σ) is 32.68+2.69=35.37 (with a resolution of UXGA and pixel pitch of 300 μm), then $27\leq B\leq 36.2$ is satisfied.

TABLE 2

(CELL THICKNESS = 4.5 μm)

| W/L = 10/5 (μm) | PIXEL PITCH (μm) | PANEL SIZE (DIAG. IN.) | A | B' | COEFFICIENT OF DETERMINATION | α | β | ERROR (3σ) |
|---|---|---|---|---|---|---|---|---|
| UXGA | 300 | 23.5 | 5.6 | 32.04 | 0.993 | 10 | 13.5 | 1.46 |
|  | 267 | 21 | — | — | — | — | — | — |
| SXGA | 300 | 20 | 5.53 | 31.3 | 0.99 | 10 | 14.5 | 1.04 |
|  | 264 | 17 | 5.6 | 31.7 | 0.995 | 11 | 14 | 1.04 |
|  | 240 | 15.5 | — | — | — | — | — | — |
| XGA | 300 | 15.1 | 5.62 | 32.3 | 0.996 | 10 | 15.5 | 1.47 |
|  | 264 | 13.3 | 5.6 | 31.7 | 0.995 | 11 | 14 | 1.04 |
|  | 240 | 12.1 | — | — | — | — | — | — |
| SVGA | 315 | 12.1 | 5.6 | 32.1 | 0.994 | 10 | 15.5 | 1.93 |
|  | 287 | 11.3 | 5.58 | 31.7 | 0.995 | 10 | 15.5 | 1.81 |
|  | 264 | 10.4 | 5.65 | 32.5 | 0.996 | 10.5 | 14 | 1.06 |

In other words, in Table 2, a minimum value of α is 10 and a maximum value of β is 15.5. Consequently, since $10\leq X\leq 15.5$, then $9.5\leq X\leq 15.5$ is satisfied. Further, since $5.53\leq A\leq 5.65$, then $5.43\leq A\leq 5.75$ is satisfied. Further, since the minimum value of B (B'−3σ) is 31.7−1.81=29.89 (with resolution of SVGA and pixel pitch of 287 μm), and the maximum value of B (B'+3σ) is 32.1+1.93=34.03 (with a resolution of SVGA and pixel pitch of 315 μm), then $27\leq B\leq 36.2$ is satisfied.

Further, with the conditions of cell thickness $T_{sel}$=3 μm, channel width W=12 μm, overlap length ΔL=2.5 μm, and channel length L=4 μm, calculations were performed for panels of various sizes and resolutions, yielding the results shown in Table 3 below.

In this way, it was found that if design is performed using design parameters which satisfy the foregoing relationships, it is possible to prepare a TFT-LCD of the counter substrate signal line structure having good display quality.

As will be discussed in the Examples to follow, when 13.3-inch XGA panels were prepared with design parameters satisfying the foregoing relationships and with design parameters not satisfying the foregoing relationships, the panels having design parameters satisfying the foregoing relationships were found to have good display quality.

Further, for comparative purposes, an XGA panel was prepared which had a channel length L of 4 μm, a pixel pitch of 264 μm, a cell thickness $T_{sel}$ of 4.5 μm, using TN liquid crystal having, in the operating range (2V to 5.5V), a

TABLE 3

(CELL THICKNESS = 3μm)

| W/L = 12/4 (μm) | PIXEL PITCH (μm) | PANEL SIZE (DIAG. IN.) | A | B' | COEFFICIENT OF DETERMINATION | α | β | ERROR (3σ) |
|---|---|---|---|---|---|---|---|---|
| UXGA | 300 | 23.5 | 5.62 | 32.68 | 0.978 | 9.5 | 13.5 | 2.69 |
| SXGA | 300 | 20 | 5.49 | 31.4 | 0.974 | 9.5 | 14.8 | 3.47 |
| XGA | 300 | 15.1 | 5.46 | 31.0 | 0.982 | 9.5 | 15.5 | 3.49 |
| SVGA | 315 | 12.1 | 5.43 | 30.7 | 0.978 | 9.6 | 15.5 | 3.69 | dielectric constant $\epsilon_P$ in the direction of the long axis of 5.7 (value with application of an effective voltage of 5.5V to the liquid crystal) and a dielectric constant $\epsilon_V$ in the direction of the short axis of 3.3 (value with application of an effective voltage of 2V to the liquid crystal).

The foregoing panel had design parameters which do not satisfy the foregoing relationships, resulting in poor display quality (especially crosstalk).

Further, as is evident from Tables 1 through 3, the range within which the liquid crystal operates decreases as the channel length L increases, and with channel lengths L exceeding 6 μm, the operating range disappears almost completely. For this reason, the channel length L must be set to no more than 6 μm.

Further, it can be seen that if pixel pitches are the same, then substantially equivalent inclinations (A) and intercepts (B) can be obtained, regardless of the resolution of the panel.

To summarize the foregoing, if TFT channel width is not more than 6 μm, and if a liquid crystal material is used having effective dielectric constants $\epsilon_P$ in the direction of the long axis and $\epsilon_V$ in the direction of the short axis which, if $X=\epsilon_P+\epsilon_V$ and $Y=\epsilon_P\cdot\epsilon_V$, satisfy $Y=A\cdot X-B$ at a certain point in the ranges $9.5 \leq X \leq 15.5$, $5.43 \leq A \leq 5.75$, and $27 \leq B \leq 36.2$, then crosstalk and flicker can be greatly suppressed, and a liquid crystal display element having good display quality can be produced.

In other words, in Tables 1 through 3, a minimum value of α is 9.5 and a maximum value of β is 15.5. Consequently, since $9.5 \leq X \leq 15.5$, then $9.5 \leq X \leq 15.5$ is satisfied. Further, $5.43 \leq A \leq 5.75$. Further, since the minimum value of B (B'-3σ) is 30.7-3.69=27.01≈27 (with resolution of SVGA and pixel pitch of 315 μm), and the maximum value of B (B'+3σ) is 33.7+2.46=36.16≈36.2 (with a resolution of XGA and pixel pitch of 240 μm), then $27 \leq B \leq 36.2$ is satisfied.

Finally, more preferable conditions were investigated. The results are shown in Table 4 below.

Table 4 shows panels, among those shown in Tables 1 through 3, which meet the foregoing conditions. From Table 4, the means, etc. listed below Table 4 were found.

The results showed that it is more preferable to use a liquid crystal material which has effective dielectric constants $\epsilon_P$ in the direction of the long axis and $\epsilon_V$ in the direction of the short axis which, if $X=\epsilon_P+\epsilon_V$ and $Y=\epsilon_P\cdot\epsilon_V$, satisfy $Y=A\cdot X-B$ at a certain point in the ranges $10.2 \leq X \leq 14.7$, $5.43 \leq A \leq 5.75$, and $27 \leq B \leq 36.2$, and that by this means crosstalk and flicker can be suppressed with certainty, and a liquid crystal display device having good display quality can be produced.

In other words, in Table 4, the mean values of α and β are 10.2 and 14.7, respectively. Thus $10.2 \leq X \leq 14.7$. Further, with regard to A and B, the foregoing conditions of $5.43 \leq A \leq 5.75$ and $27 \leq B \leq 36.2$ were used.

Further, it was found that it is most preferable to use a liquid crystal material which has effective dielectric constants $\epsilon_P$ in the direction of the long axis and $\epsilon_V$ in the direction of the short axis which, if $X=\epsilon_P+\epsilon_V$ and $Y=\epsilon_P\cdot\epsilon_V$, satisfy $Y=A\cdot X-B$ at a certain point in the ranges $10.2 \leq X \leq 14.7$, A=5.59, and B=32.02, and that by this means crosstalk and flicker can be suppressed with even more certainty, and a liquid crystal display device having good display quality can be produced.

In other words, since the mean values of α and β are 10.2 and 14.7, respectively, $10.2 \leq X \leq 14.7$ was used. Further, with regard to A and B, the mean values of A (5.59) and B' (32.02) were used.

TABLE 4

(CELL THICKNESS = 3μm)

| W/L = 8/4 (μm) | PIXEL PITCH (μm) | PANEL SIZE (DIAG. IN.) | A | B' | COEFFICIENT OF DETERMINATION | α | β | ERROR (3σ) |
|---|---|---|---|---|---|---|---|---|
| UXGA | 300 | 23.5 | 5.58 | 32 | 0.982 | 10 | 13.5 | 1.46 |
| | 267 | 21 | 5.61 | 32.2 | 0.995 | 10.55 | | 1.55 |
| SXGA | 300 | 20 | 5.56 | 31.9 | 0.983 | 10 | 14.5 | 1.39 |
| | 264 | 17 | 5.66 | 32.7 | 0.996 | 10.55 | | 1.39 |
| | 240 | 15.6 | 5.75 | 33.7 | 0.992 | 12 | 14 | 1.10 |
| XGA | 300 | 15.1 | 5.5 | 31.1 | 0.991 | 10 | 15.8 | 2.46 |
| | 264 | 13.3 | 5.66 | 32.7 | 0.996 | 10 | 15 | 1.20 |
| | 240 | 12.1 | 5.75 | 33.7 | 0.992 | 12 | 14 | 2.46 |
| SVGA | 315 | 12.1 | 5.49 | 31.2 | 0.985 | 10 | 15.5 | 3.09 |
| | 287 | 11.3 | 5.57 | 31.9 | 0.991 | 10 | 15.5 | 1.92 |
| | 264 | 10.4 | 5.62 | 32.3 | 0.996 | 10 | 15.5 | 1.52 |
| UXGA | 300 | 23.5 | 5.6 | 32.04 | 0.993 | 10 | 13.5 | 1.46 |
| SXGA | 300 | 20 | 5.53 | 31.3 | 0.99 | 10 | 14.5 | 1.04 |
| | 284 | 17 | 5.6 | 31.7 | 0.995 | 11 | 15 | 1.04 |
| XGA | 300 | 15.1 | 5.62 | 32.3 | 0.996 | 10 | 15.5 | 1.47 |
| | 264 | 13.3 | 5.6 | 31.7 | 0.995 | 11 | 14 | 1.04 |
| SVGA | 315 | 12.1 | 5.6 | 32.1 | 0.994 | 10 | 15.5 | 1.93 |
| | 287 | 11.3 | 5.58 | 31.7 | 0.995 | 10 | 15.5 | 1.81 |
| | 264 | 10.4 | 5.65 | 32.5 | 0.996 | 10.54 | | 1.06 |
| UXGA | 300 | 23.5 | 5.62 | 32.68 | 0.978 | 9.53 | .5 | 2.69 |
| SXGA | 300 | 20 | 5.49 | 31.4 | 0.974 | 9.54 | .5 | 3.47 |
| XGA | 300 | 15.1 | 5.48 | 31.0 | 0.982 | 9.55 | .5 | 3.49 |
| SVGA | 315 | 12.1 | 5.43 | 30.7 | 0.978 | 9.55 | .5 | 3.69 |

| | A | B' | | α | β |
|---|---|---|---|---|---|
| σ | 0.080828 | 0.76442 | σ: | 0.6887 | 0.766131 |
| MEAN | 5.888261 | 32.02261 | MEAN: | 10.23913 | 14.71739 |
| MEAN + 3σ: | 5.830746 | 34.31587 | | | |
| MEAN − 3σ: | 5.345776 | 29.72935 | | | |

Further, under the foregoing conditions, if TFT channel length L is not more than 5 µm, crosstalk and flicker can be suppressed with certainty, and a liquid crystal display element with good display can be produced.

Further, under the foregoing conditions, if the cell thickness $T_{sel}$ of the liquid crystal is not less than 0.5 µm and not more than 6 µm, crosstalk and flicker can be suppressed with certainty, and a liquid crystal display element with good display quality can be produced. Incidentally, the foregoing lower limit of the cell thickness $T_{sel}$ is 0.5 µm because this was the minimum cell thickness $T_{sel}$ used in making the foregoing calculations. Accordingly, by redoing the foregoing calculations, it may be possible to greatly suppress crosstalk and flicker and produce a liquid crystal display device with good display quality using a limited value of less than 0.5 µm for the cell thickness $T_{sel}$.

Incidentally, among existing products, the minimum cell thickness $T_{sel}$ currently on the market is 1 µm, and other products on the market have cell thicknesses $T_{sel}$ from 3 µm (for perpendicularly aligned liquid crystal) up to 4.5 µm or 5 µm (existing TN liquid crystal).

The foregoing conditions can be applied to liquid crystal materials having positive anisotropy of the dielectric constant by satisfying $\epsilon_P > \epsilon_V$, and in this way, since most existing TN liquid crystals have positive anisotropy of the dielectric constant, crosstalk and flicker can be greatly reduced in most TN liquid crystals, and a liquid crystal display device having good display quality can be produced.

Further, the foregoing conditions can be applied to liquid crystal materials having negative anisotropy of the dielectric constant by satisfying $\epsilon_P < \epsilon_V$, and in this way, crosstalk and flicker can be greatly reduced in perpendicularly aligned liquid crystals, which have negative anisotropy of the dielectric constant, and a liquid crystal display device having good display quality can be produced.

In addition, under the foregoing conditions, if, in a TFT, overlap between the gate electrode (first terminal) and a contact layer sandwiched between the source electrode (second terminal) and drain electrode (third terminal) and a semiconductor layer, i.e., if the overlap length ΔL is not more than 3 µm, crosstalk and flicker can be greatly reduced in most TFTs, and a liquid crystal display device having good display quality can be produced.

In other words, with regard to shift of the direct-current component (which is determined by Equations (19), (18), (3), (5), and (6)) and crosstalk (which is determined by Equations (21), (4), (5), and (6)), a small overlap length ΔL is preferable. In existing production, the overlap length ΔL is 2.5 µm.

Accordingly, by setting the overlap length ΔL to not more than 3 µm, crosstalk and flicker evident in existing products can be greatly reduced, and a liquid crystal display device with good display quality can be produced.

Figure 12:
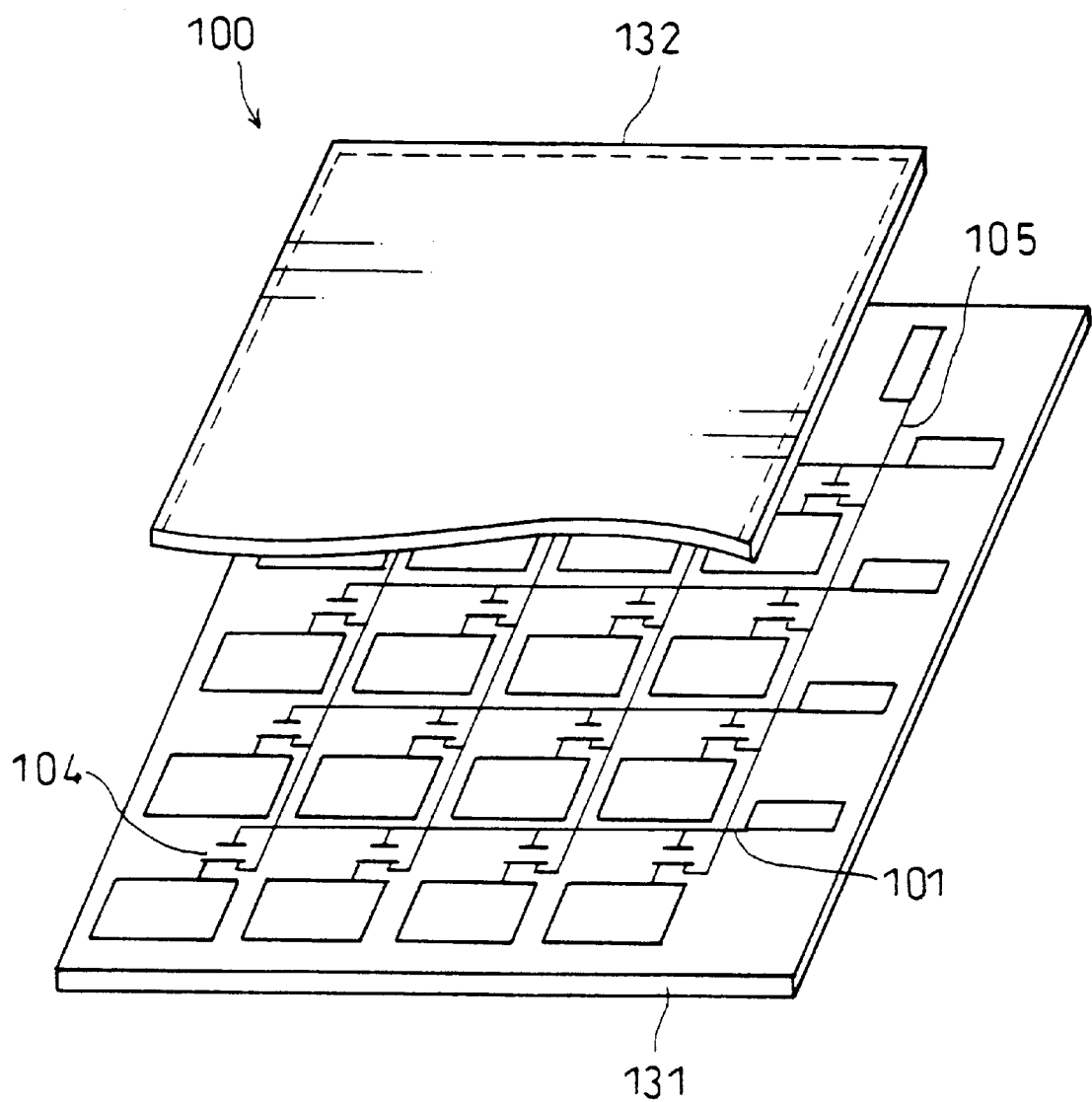
FIG. 12 is a drawing schematically showing a typical TFT-LCD having line intersections.
Figure 13:
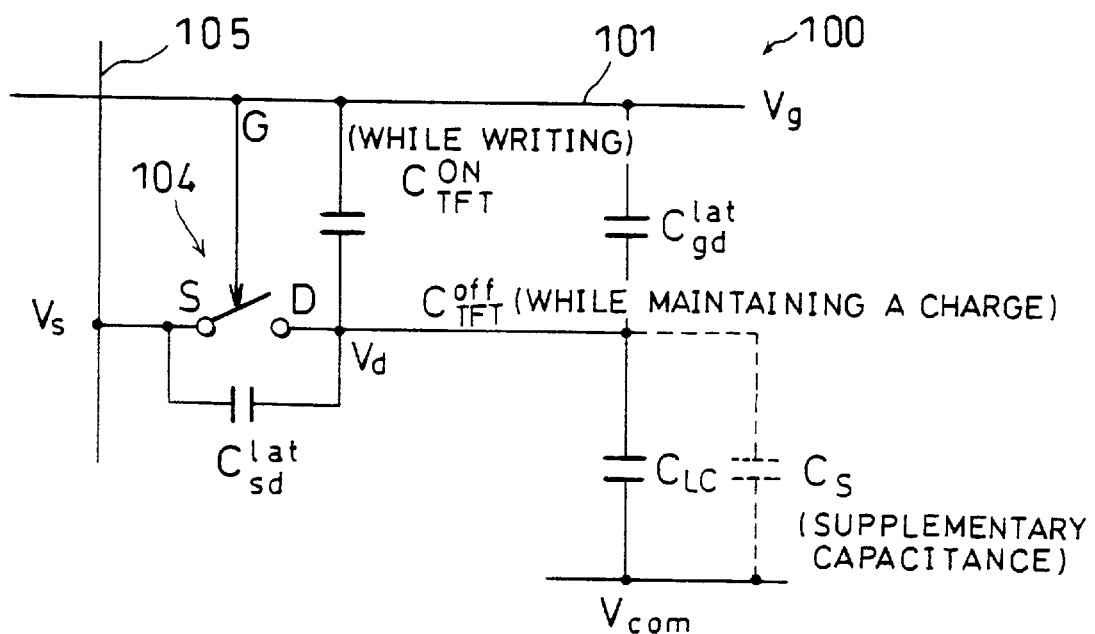
FIG. 13 is an equivalent circuit diagram of one pixel of the foregoing TFT-LCD having line intersections.

Further, it is of course fully possible to apply the foregoing liquid crystal to existing panels having line intersections, i.e., to panels like that shown in FIGS. 12 and 13, provided with a glass substrate 131 (pixel substrate) including TFTs 104 (3-terminal switching elements) arranged in matrix form, scanning lines 101, each connected to the first terminals of the TFTs 104 of one column, pixel electrodes, each connected to the second terminals of the TFTs 104 of one column, and signal lines 105, each connected to the third terminals of the TFTs 104 of one row; a substrate 132 (counter substrate) positioned opposite the glass substrate 131, including counter electrodes opposite each of the pixel electrodes; and liquid crystal sandwiched between the glass substrate 131 and the substrate 132.

By applying the foregoing liquid crystal to such a liquid crystal panel, crosstalk and flicker can be reduced over conventional panels, and display quality can be further improved.

Moreover, the foregoing conditions are suited to panels having resolutions of VGA or better. In this way, in typical liquid crystal display devices, crosstalk and flicker can be greatly reduced, and a liquid crystal display device having good display quality can be produced.

Further, the foregoing conditions are suited to a structure in which only one TFT is connected to each RGB pixel.

In this case, crosstalk and flicker can be greatly reduced and a liquid crystal display device having good display quality produced while giving consideration to size reduction. In other words, in some conventional panels, each RGB pixel is connected to two TFTs, but in order to reduce size, connection to only one TFT is preferable.

Further, the foregoing conditions are suited to TFTs made of amorphous silicon.

By applying the foregoing conditions to liquid crystal display devices provided with amorphous silicon TFTs, crosstalk and flicker can be greatly reduced, and a liquid crystal display device having good display quality can be produced.

Incidentally, the liquid crystal display device according to the present invention assumes driving at 60 Hz. In the future, driving at 75 Hz may become the norm, but it goes without saying that the foregoing conditions can also be adapted to such a situation.

The liquid crystal display device according to the present invention may be structured so as to use any of the liquid crystal materials explained above, and so as to be provided with a pixel substrate including 3-terminal switching elements arranged in matrix form, scanning lines, each connected to the first terminals of the switching elements of one column, and pixel electrodes, each connected to the second terminals of the switching elements of one column; a counter substrate positioned opposite the pixel substrate, including counter electrodes opposite each of the pixel electrodes, and signal lines which connect the counter electrodes of each row; and liquid crystal sandwiched between the pixel substrate and the counter substrate; in which the 3-terminal switching elements are TFTs, and channel length of each TFT is not more than 6 µm.

With the foregoing structure, crosstalk, flicker, and shift of the direct-current component can be reduced with certainty, and thus a liquid crystal display device can be realized which has high productivity and an image quality suitable for large-screen, high-definition devices.

Further, the liquid crystal display device according to the present invention may be structured so as to use any of the liquid crystal materials explained above, and so as to be provided with a pixel substrate including 3-terminal switching elements arranged in matrix form, scanning lines, each connected to the first terminals of the switching elements of one column, and pixel electrodes, each connected to the second terminals of the switching elements of one column; a counter substrate positioned opposite the pixel substrate, including counter electrodes opposite each of the pixel electrodes, and signal lines which connect the counter electrodes of each row; and liquid crystal sandwiched between the pixel substrate and the counter substrate; in which the 3-terminal switching elements are TFTs, and channel length of each TFT is not more than 5 µm.

With the foregoing structure, crosstalk, flicker, and shift of the direct-current component can be reduced with even greater certainty, and thus a liquid crystal display device can be realized which has high productivity and an image quality suitable for large-screen, high-definition devices.

Further, the liquid crystal display device according to the present invention may be structured so as to use any of the liquid crystal materials explained above, and so as to be provided with a pixel substrate including 3-terminal switching elements arranged in matrix form, scanning lines, each connected to the first terminals of the switching elements of one column, pixel electrodes, each connected to the second terminals of the switching elements of one column, and signal lines connected to the third terminals of the switching elements; a counter substrate positioned opposite the pixel substrate, including counter electrodes opposite each of the pixel electrodes; and liquid crystal sandwiched between the pixel substrate and the counter substrate; in which the 3-terminal switching elements are TFTs, and channel length of each TFT is not more than 6 µm.

With the foregoing structure, crosstalk, flicker, and shift of the direct-current component can be reduced with certainty, and thus a liquid crystal display device can be realized which has high productivity and an image quality suitable for large-screen, high-definition devices.

EXAMPLES

Example 1

Figure 5:
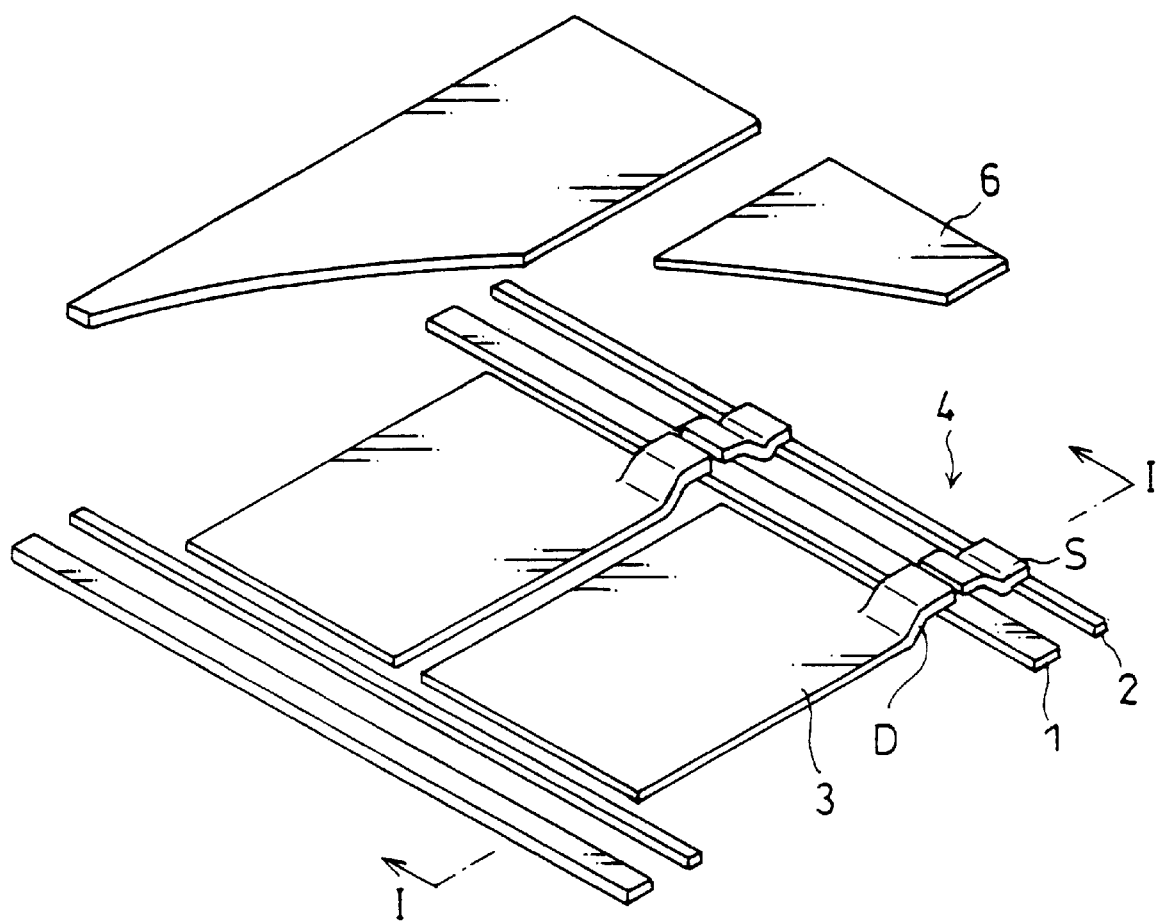
FIG. 5 is a perspective view of a TFT-LCD having a counter substrate signal line structure.
Figure 6:
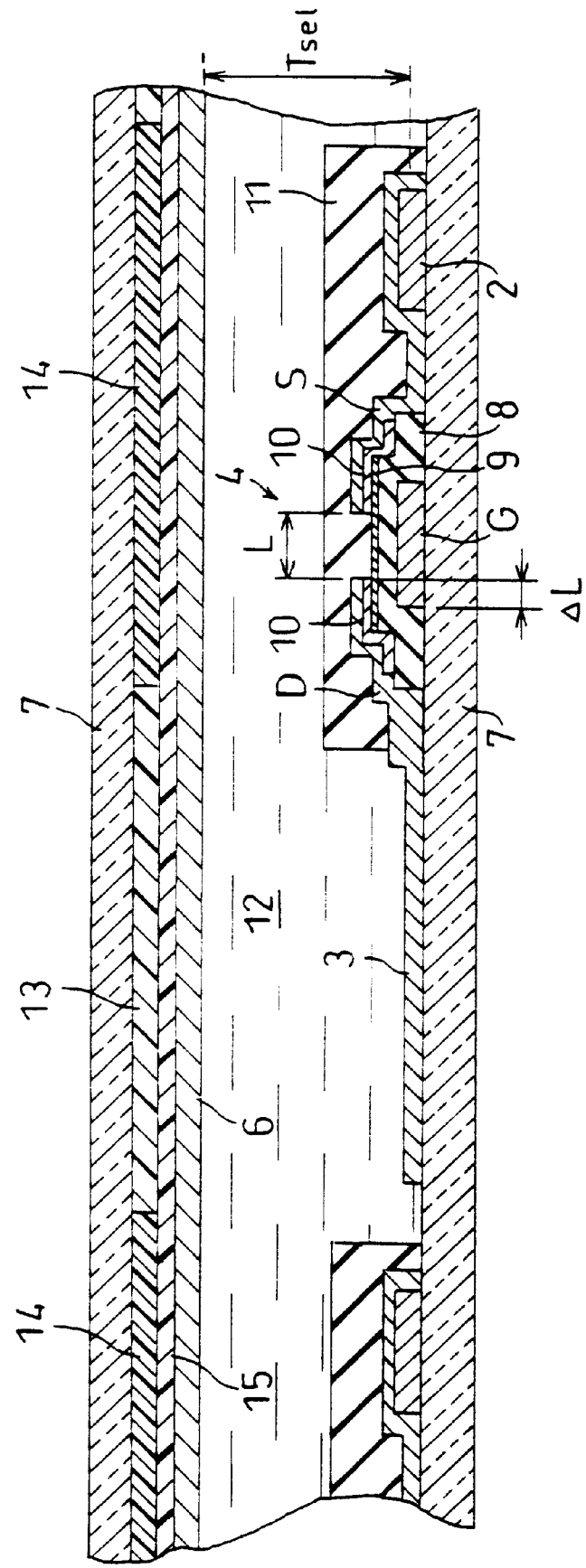
FIG. 6 is a cross-sectional view taken along line I—I of the TFT-LCD shown in FIG. 5.

The following will explain an Example of the present invention. FIG. 5 shows the structure of an amorphous-silicon TFT-LCD according to the present Example, which has a counter substrate signal line structure. Further, FIG. 6 is a cross-sectional view showing the structure of the TFT-LCD having a counter substrate signal line structure according to the present Example, taken along line I—I of FIG. 5, and FIG. 7 is an equivalent circuit diagram of the counter substrate signal line TFT-LCD according to the present Example. Incidentally, the present Example uses TFTs made of amorphous silicon, but there is no particular limitation to this; alternatively, TFTs made of crystalline silicon may also be used.

As shown in FIGS. 5 and 6, TFTs 4 (thin-film transistors) are provided on an insulating substrate 7. Scanning lines 1, a gate electrode G, and reference potential lines 2 have, for example, laminated structures of TaNx/α-Ta/TaNx, with the α-Ta having a film thickness of 340 nm.

A gate insulating layer 8 is made of, for example, a silicon nitride film 450 nm in thickness, and an intrinsic semiconductor layer 9 is made of, for example, an amorphous silicon layer 150 nm in thickness. Further, a contact layer 10 is made of, for example, a microcrystalline silicon n$^+$ layer 40 nm in thickness. Further, a pixel electrode 3 and drain and source electrodes D and S are made of, for example, ITO films 150 nm in thickness. On top of the foregoing members is provided a passivation layer 11. Here, each TFT 4 has a channel length L of 4 µm and a channel width W of 8 µm (see FIG. 3(b)).

Further, an insulating substrate 7 on the opposite side is provided with color filter layers 13 and black matrix layers 14, and lower surfaces of these are provided with an overcoat layer 15 (leveling layer) with a thickness of, for example, 2 µm. On the lower surface of the overcoat layer 15 is provided an $SiO_2$ film (not shown), the lower surface of which is provided with a counter electrode 6 and counter substrate signal lines 5 (shown in FIG. 7), which are made of, for example, transparent conductive films of ITO 200 nm in thickness.

Further, a liquid crystal layer 12 (shown in FIG. 6) sandwiched between the insulating substrate 7 on the TFT 4 side and the insulating substrate 7 on the opposing side is made of a fluorine-based TN liquid crystal material having, within an operating range of 1.8V to 5V, a dielectric constant $\epsilon_P$ in the direction of the long axis of 7.9 (value with application of an effective voltage of 5V to the liquid crystal) and a dielectric constant $\epsilon_V$ in the direction of the short axis of 5.3 (value with application of an effective voltage of 1.8V to the liquid crystal). Further, cell thickness $T_{sel}$ is 4.5 µm, pixel pitch is 264 µm, and resolution is XGA.

Here, it is sufficient if the various materials used (other than the liquid crystal) are equivalent from the point of view of the circuit. Further, the scanning lines 1, the gate electrode G, and the reference potential line 2 may alternatively be made of a metal of high melting point, such as Cr or MoTa, or of a metal of low resistance, such as aluminum or aluminum alloy which are often used in integrated circuits (ICs). The gate insulating layer 8 of the TFT 4 may alternatively have a laminated structure of silicon oxide and silicon nitride films, or of an anodized film and a silicon nitride film. Further, the contact layer 10 may be made of an amorphous silicon n+layer instead of a microcrystalline silicon n$^+$ layer, and the drain and source electrodes D and S may alternatively be made of a barrier metal such as Ti or Mo.

In the foregoing liquid crystal display element, TFT channel length L was not more than 6 µm, and the parameters of the liquid crystal layer 12 made of a TN liquid crystal material had effective dielectric constants $\epsilon_P$ in the direction of the long axis and $\epsilon_V$ in the direction of the short axis which, if $X=\epsilon_P+\epsilon_V$ and $Y=\epsilon_P \cdot \epsilon_V$, satisfy $Y=A \cdot X-B$ at a certain point in the ranges $9.5 \leq X \leq 15.5$, $5.43 \leq A \leq 5.75$, and $27 \leq B \leq 36.2$.

As a result, it was possible to obtain a good liquid crystal display element in which flicker in the display screen was greatly suppressed, and crosstalk was not noticeable to human eyes.

Example 2

The following will explain another example of the present invention. For ease of explanation, members having the same functions as those shown in the drawings pertaining to Example 1 above will be given the same reference symbols, and explanation thereof will be omitted here.

In the present Example, in contrast to Example 1, the liquid crystal layer 12 (shown in FIG. 6) sandwiched between the insulating substrate 7 on the TFT 4 side and the insulating substrate 7 on the opposing side was a perpendicularly aligned liquid crystal material. This perpendicularly aligned liquid crystal material had, within an operating range of 2V to 5.5V, a dielectric constant $\epsilon_V$ in the direction of the short axis of 6.0 (value with application of an effective voltage of 5.5V to the liquid crystal) and a dielectric constant $\epsilon_P$ in the direction of the long axis of 3.5 (value with application of an effective voltage of 2V to the liquid crystal). Further, cell thickness $T_{sel}$ was 3 µm, pixel pitch was 298 µm, and resolution was XGA.

Other conditions were equivalent to those in Example 1 above.

In the foregoing liquid crystal display element, TFT channel length L was not more than 6 µm, and the parameters of the liquid crystal layer 12 made of a perpendicularly aligned liquid crystal material had effective dielectric constants $\epsilon_P$ in the direction of the long axis and $\epsilon_V$ in the direction of the short axis which, if $X=\epsilon_P+\epsilon_V$ and $Y=\epsilon_P \cdot \epsilon_V$, satisfy $Y=A \cdot X-B$ at a certain point in the ranges $9.5 \leq X \leq 15.5$, $5.43 \leq A \leq 5.75$, and $27 \leq B \leq 36.2$.

As a result, it was possible to obtain a good liquid crystal display element in which flicker in the display screen was greatly suppressed, and crosstalk was not noticeable to human eyes.

Example 3

The following will explain another example of the present invention. For ease of explanation, members having the same functions as those shown in the drawings pertaining to Example 1 above will be given the same reference symbols, and explanation thereof will be omitted here.

In the present Example, the liquid crystal layer 12 (shown in FIG. 6) sandwiched between the insulating substrate 7 on the TFT 4 side and the insulating substrate 7 on the opposing side was a fluorine-based TN liquid crystal material having, within an operating range of 2V to 5.5V, a dielectric constant $\epsilon_P$ in the direction of the long axis of 7.3 (value with application of an effective voltage of 5.5V to the liquid crystal) and a dielectric constant $\epsilon_V$ in the direction of the short axis of 5.5 (value with application of an effective voltage of 2V to the liquid crystal). Further, cell thickness $T_{sel}$ was 4.5 μm, pixel pitch was 264Am, and resolution was XGA.

Other conditions were equivalent to those in Examples 1 and 2 above.

In the foregoing liquid crystal display element, TFT channel length L was not more than 6 μm, and the parameters of the liquid crystal layer 12 made of a TN liquid crystal material had effective dielectric constants $\epsilon_P$ in the direction of the long axis and $\epsilon_V$ in the direction of the short axis which, if X=$\epsilon_P$+$\epsilon_V$ and Y=$\epsilon_P$·$\epsilon_V$, satisfy Y=A·X=B at a certain point in the ranges $9.5 \leq X \leq 15.5$, $5.43 \leq A \leq 5.75$, and $27 \leq B \leq 36.2$.

As a result, it was possible to obtain a good liquid crystal display element in which flicker in the display screen was greatly suppressed, and crosstalk was not noticeable to human eyes.

Example 4

Figure 8:
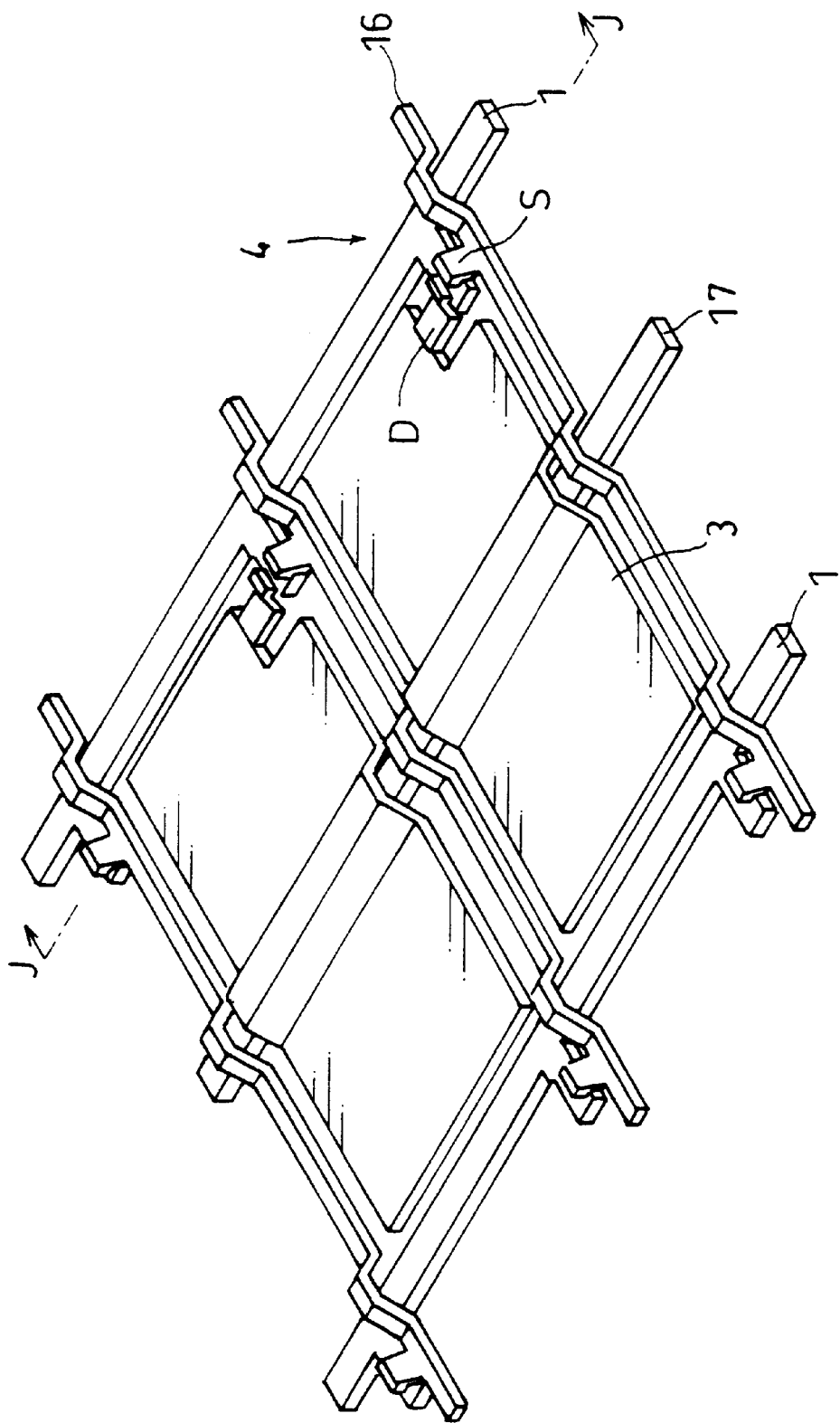
FIG. 8 is a perspective view showing a TFT-LCD according to another example of the present invention, having a counter substrate signal line structure.
Figure 9:
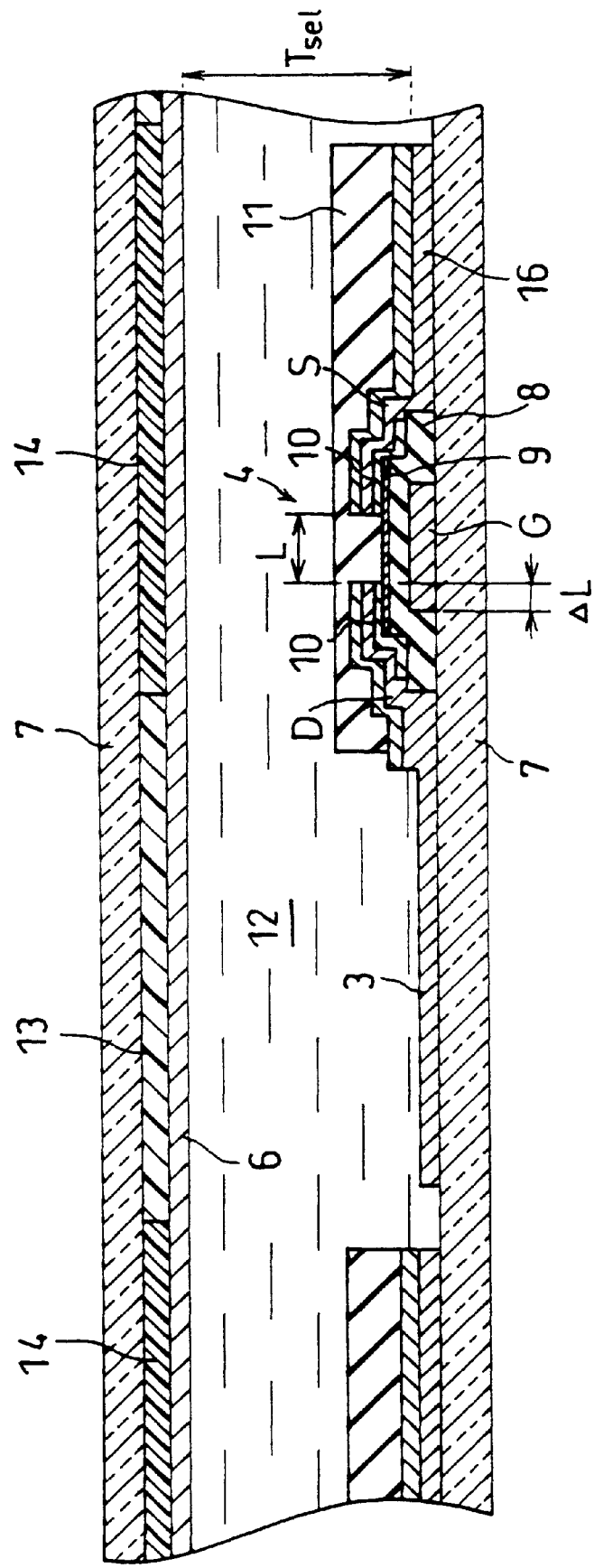
FIG. 9 is a cross-sectional view taken along line J—J of the TFT-LCD shown in FIG. 8.

The following will explain a further example of the present invention with reference to FIGS. 8 and 9. For ease of explanation, members having the same functions as those shown in the drawings pertaining to Example 1 above will be given the same reference symbols, and explanation thereof will be omitted here.

As shown in FIGS. 8 and 9, TFTs 4 are provided on an insulating substrate 7. Scanning lines 1, common lines 17, and a gate electrode G have, for example, laminated structures of TaNx/α-Ta/TaNx, with the α-Ta having a film thickness of 340 nm.

A gate insulating layer 8 is made of, for example, a silicon nitride film 450 nm in thickness, and an intrinsic semiconductor layer 9 is made of, for example, an amorphous silicon layer. Further, a contact layer 10 is made of, for example, a microcrystalline silicon n+ layer 40 nm in thickness. Further, a pixel electrode 3 is made of, for example, an ITO film 150 nm in thickness.

Signal lines 16 and drain and source electrodes D and S have, for example, laminated structures of α-Ta/TaNx and ITO films, with the α-Ta having a film thickness of 260 nm.

Further, on top of the foregoing members is provided a passivation layer 11 made of, for example, silicon nitride 300 nm in thickness. Here, the TFTs 4 have a channel length L of 4 μm and a channel width W of 10 μm.

Further, an insulating substrate 7 on the opposite side is provided with color filter layers 13 and black matrix layers 14, and lower surfaces of these are provided with a counter electrode 6, which is made of, for example, a transparent conductive film of ITO 200 nm in thickness.

Further, a liquid crystal layer 12 (shown in FIG. 9) sandwiched between the insulating substrate 7 on the TFT 4 side and the insulating substrate 7 on the opposing side is made of a fluorine-based TN liquid crystal material having, within an operating range of 1.8V to 5V, a dielectric constant $\epsilon_P$ in the direction of the long axis of 7.9 (value with application of an effective voltage of 5V to the liquid crystal) and a dielectric constant $\epsilon_V$ in the direction of the short axis of 5.3 (value with application of an effective voltage of 1.8V to the liquid crystal). Further, cell thickness $T_{sel}$ is 4.5 μm, pixel pitch is 264 μm, and resolution is XGA.

Here, it is sufficient if the various materials used (other than the liquid crystal) are equivalent from the point of view of the circuit. Further, the scanning lines 1, the gate electrode G, and the common lines 17 may alternatively be made of a metal of high melting point, such as Cr or MoTa, or of a metal of low resistance, such as aluminum or aluminum alloy which are often used in integrated circuits (ICs). The gate insulating layer 8 of the TFT 4 may alternatively have a laminated structure of silicon oxide and silicon nitride films, or of an anodized film and a silicon nitride film. Further, the contact layer 10 may be made of an amorphous silicon n+ layer instead of a microcrystalline silicon n+ layer, and the drain and source electrodes D and S may alternatively be made of a barrier metal such as Ti or Mo.

In the foregoing liquid crystal display element, TFT channel length L was not more than 6 μm, and the parameters of the liquid crystal layer 12 made of a TN liquid crystal material had effective dielectric constants $\epsilon_P$ in the direction of the long axis and $\epsilon_V$ in the direction of the short axis which, if X=$\epsilon_P$+$\epsilon_V$ and Y=$\epsilon_P$·$\epsilon_V$, satisfy Y=A·X–B at a certain point in the ranges $9.5 \leq X \leq 15.5$, $5.43 \leq A \leq 5.75$, and $27 \leq B \leq 36.2$.

As a result, it was possible to obtain a good liquid crystal display element in which flicker in the display screen was greatly suppressed, and crosstalk was not noticeable to human eyes.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention or exceed the scope of the patent claims set forth below.

What is claimed is:

1. A liquid crystal display device which includes a liquid crystal material having an effective dielectric constant $\epsilon_P$ in a direction of a long axis and an effective dielectric constant $\epsilon_V$ in a direction of a short axis which, if X=$\epsilon_P$+$\epsilon_V$ and Y=$\epsilon_P$·$\epsilon_V$, satisfy Y=A·X–B at a certain point in the ranges $9.5 \leq X \leq 15.5$, $5.43 \leq A \leq 5.75$, and $27 \leq B \leq 36.2$.

2. A liquid crystal display device which includes a liquid crystal material having an effective dielectric constant $\epsilon_P$ in a direction of a long axis and an effective dielectric constant $\epsilon_V$ in a direction of a short axis which, if X=$\epsilon_P$+$\epsilon_V$ and Y=$\epsilon_P$·$\epsilon_V$, satisfy Y=A·X–B at a certain point in the ranges $10.2 \leq X \leq 14.7$, $5.43 \leq A \leq 5.75$, and $27 \leq B \leq 36.2$.

3. A liquid crystal display device which includes a liquid crystal material having an effective dielectric constant $\epsilon_P$ in a direction of a long axis and an effective dielectric constant $\epsilon_V$ in a direction of a short axis which, if X=$\epsilon_P$+$\epsilon_V$ and $Y=\epsilon_P \cdot \epsilon_V$, satisfy $Y=A \cdot X-B$ at a certain point in the ranges $10.2 \leq X \leq 14.7$, $A=5.59$, and $B=32.02$.

4. The liquid crystal display device set forth in claim 1, comprising:

a pixel substrate including switching elements arranged in matrix form, each said switching element having three terminals; scanning lines, each connected to first terminals of said switching elements of one column; and pixel electrodes, each connected to second terminals of said switching elements of one column;

a counter substrate positioned opposite said pixel substrate, including counter electrodes opposite each of said pixel electrodes, and signal lines which connect said counter electrodes of each row; and liquid crystal sandwiched between said pixel substrate and said counter substrate;

wherein said switching elements are thin-film transistors, and each said thin-film transistor has a channel length of not more than 6 μm.

5. The liquid crystal display device set forth in claim 1, comprising:

a pixel substrate including switching elements arranged in matrix form, each said switching element having three terminals; scanning lines, each connected to first terminals of said switching elements of one column; and pixel electrodes, each connected to second terminals of said switching elements of one column;

a counter substrate positioned opposite said pixel substrate, including counter electrodes opposite each of said pixel electrodes, and signal lines which connect said counter electrodes of each row; and liquid crystal sandwiched between said pixel substrate and said counter substrate;

wherein said switching elements are thin-film transistors, and each said thin-film transistor has a channel length of not more than 5 μm.

6. The liquid crystal display device set forth in claim 1, comprising:

a pixel substrate including switching elements arranged in matrix form, each said switching element having three terminals; scanning lines, each connected to first terminals of said switching elements of one column; pixel electrodes, each connected to second terminals of said switching elements of one column; and signal lines connected to third terminals of said switching elements;

a counter substrate positioned opposite said pixel substrate, including counter electrodes opposite each of said pixel electrodes;

and liquid crystal sandwiched between said pixel substrate and said counter substrate;

wherein said switching elements are thin-film transistors, and each said thin-film transistor has a channel length of not more than 6 μm.

7. The liquid crystal display device set forth in claim 4, wherein:

in each said thin-film transistor, length of an overlap between (i) said first terminal and (ii) a contact layer sandwiched between said second and third terminals and a semiconductor layer is not more than 3 μm.

8. The liquid crystal display device set forth in claim 6, wherein:

in each said thin-film transistor, length of an overlap between (i) said first terminal and (ii) a contact layer sandwiched between said second and third terminals and a semiconductor layer is not more than 3 μm.

9. The liquid crystal display device set forth in claim 4, wherein:

said thin-film transistor is an amorphous silicon thin-film transistor.

10. The liquid crystal display device set forth in claim 6, wherein:

said thin-film transistor is an amorphous silicon thin-film transistor.

11. The liquid crystal display device set forth in claim 4, wherein: one said thin-film transistor is provided in each R, G, and B pixel.

12. The liquid crystal display device set forth in claim 6, wherein:

one said thin-film transistor is provided in each R, G, and B pixel.

* * * * *